US008990688B2

(12) United States Patent
Lee et al.

(10) Patent No.: US 8,990,688 B2
(45) Date of Patent: Mar. 24, 2015

(54) PROACTIVE USER INTERFACE INCLUDING EVOLVING AGENT

(75) Inventors: Jong-Goo Lee, Seoul (KR); Eval Toledano, Kiryat Ata (IL); Natan Linder, Motaz Illit (IL); Ran Ben-Yair, Harrey Yehuda (IL); Yariv Eisenberg, Tel-Aviv (IL)

(73) Assignee: Samsung Electronics Co., Ltd. (KR)

( * ) Notice: Subject to any disclaimer, the term of this patent is extended or adjusted under 35 U.S.C. 154(b) by 2309 days.

(21) Appl. No.: 10/933,583

(22) Filed: Sep. 3, 2004

(65) Prior Publication Data
US 2005/0118996 A1 Jun. 2, 2005

Related U.S. Application Data

(63) Continuation-in-part of application No. 10/743,476, filed on Dec. 23, 2003.

(60) Provisional application No. 60/500,669, filed on Sep. 5, 2003.

(30) Foreign Application Priority Data

Mar. 10, 2004 (KR) .................... 10-2004-0016266

(51) Int. Cl.
*G06F 3/048* (2013.01)
*G06F 9/44* (2006.01)
(Continued)

(52) U.S. Cl.
CPC .............. *G06F 9/4443* (2013.01); *G06F 3/011* (2013.01); *G06F 3/0482* (2013.01); *H04M 1/72544* (2013.01); *H04M 1/72552* (2013.01); *H04M 1/72563* (2013.01); *H04M 1/72583* (2013.01);
(Continued)

(58) Field of Classification Search
USPC .................................................. 715/745, 765
See application file for complete search history.

(56) References Cited

U.S. PATENT DOCUMENTS 5,875,108 A  2/1999 Hoffberg et al.
5,880,731 A * 3/1999 Liles et al. .................... 715/758
(Continued)

FOREIGN PATENT DOCUMENTS

JP  11-076610  3/1999
JP  11-259446  9/1999
(Continued)

OTHER PUBLICATIONS

Cristina Cuenca et al., An Agent System for Learning Profiles in Broadcasting Applications on the Internet, 1998.
(Continued)

*Primary Examiner* — Andrey Belousov
(74) *Attorney, Agent, or Firm* — The Farrell Law Firm, P.C.

(57) ABSTRACT

A proactive user interface, installed in (or otherwise control and/or be associated with) any type of computational device. The proactive user interface actively makes suggestions to the user, based upon prior experience with a particular user and/or various preprogrammed patterns from which the computational device could select, depending upon user behavior. These suggestions can be made by altering the appearance of at least a portion of the display, for example by changing a menu or a portion thereof; providing different menus for display; and/or altering touch screen functionality. The suggestions can also be made audibly.

26 Claims, 31 Drawing Sheets

(51) Int. Cl.
  *G06F 3/01*  (2006.01)
  *G06F 3/0482*  (2013.01)
  *H04M 1/725*  (2006.01)
(52) U.S. Cl.
  CPC ...... *H04M 1/72586* (2013.01); *H04M 2250/12* (2013.01)
  USPC .......................................... 715/706; 715/765

(56) References Cited

U.S. PATENT DOCUMENTS

| | | | |
|---|---|---|---|
| 6,249,720 | B1 | 6/2001 | Kubota et al. |
| 6,400,996 | B1 * | 6/2002 | Hoffberg et al. ................ 700/83 |
| 2003/0046689 | A1 * | 3/2003 | Gaos ............................... 725/34 |
| 2003/0093236 | A1 | 5/2003 | Wu et al. |
| 2003/0093419 | A1 | 5/2003 | Bangalore et al. |

FOREIGN PATENT DOCUMENTS

| | | |
|---|---|---|
| KR | 10-2000-0054846 | 9/2000 |
| KR | 2002-3394 | 1/2002 |
| KR | 10-2002-0032449 | 5/2002 |
| WO | WO 01/59680 | 8/2001 |
| WO | WO 01/69380 | 9/2001 |

OTHER PUBLICATIONS

Lunatic Dawn III Guide, May 25, 1999.
Karl Sims, "Evolving Virtual Creatures", Computer Graphics, SIGGRAPH '94 Proceedings, Jul. 1994.
Ales Ude et al., "Automatic Generation of Kinematic Models for the Conversion of Human Motion Capture Data into Humanoid Robot Motion", First IEEE-RAS Int. Conf. Humanoid Robots, Sep. 2000.
Michael Mateas et al., "A Behavior Language for Story-Based Believable Agents", Working Notes of Artificial Intelligence and Interactive Entertainment, AAAI Spring Symposium Series, 2002.

* cited by examiner

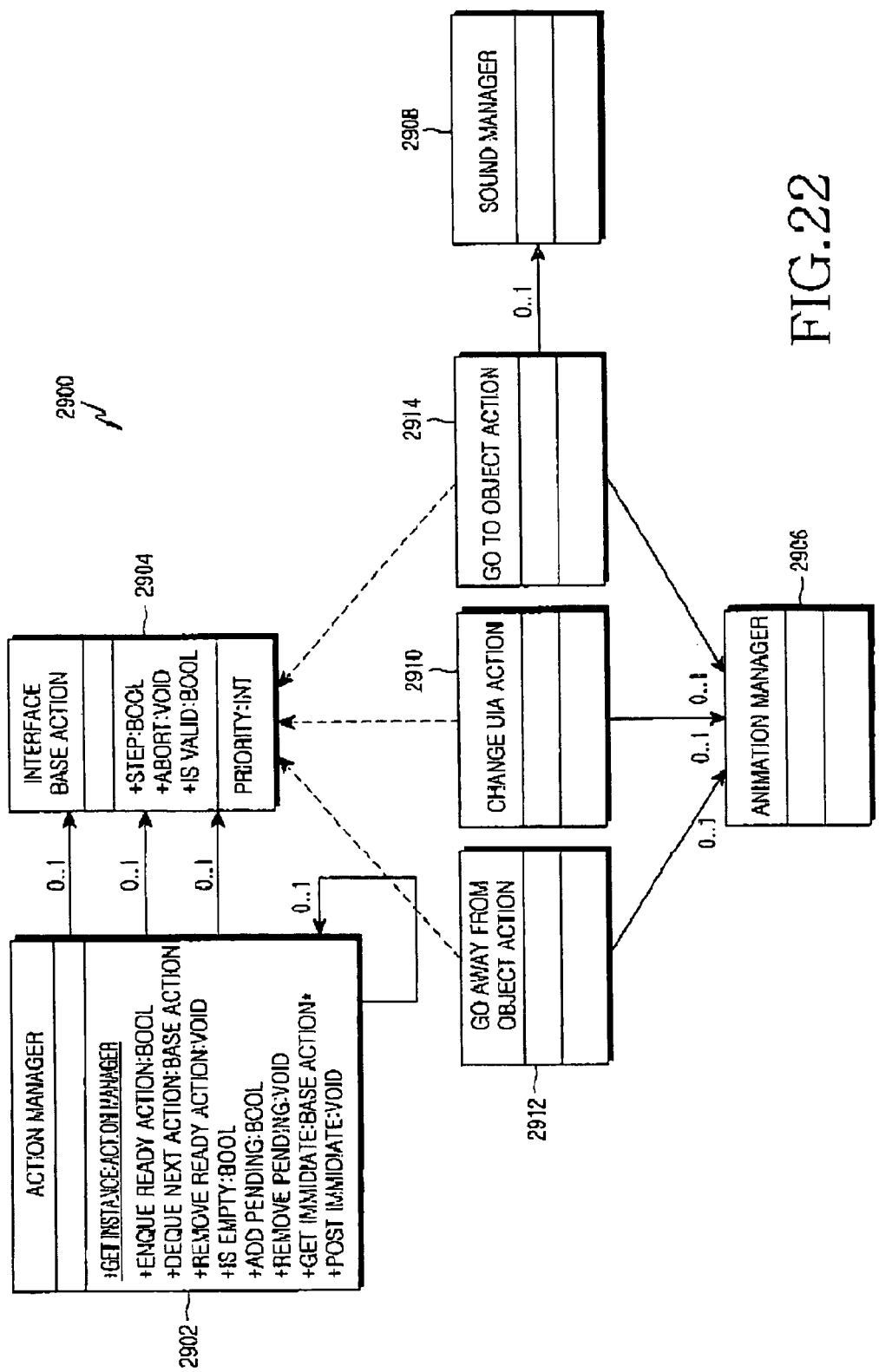

PROACTIVE USER INTERFACE INCLUDING EVOLVING AGENT

PRIORITY

This application is a continuation-in-part of application Ser. No. 10/743,476, filed Dec. 23, 2003, which claims the benefit of U.S. Provisional Application No. 60/500,669, filed Sep. 5, 2003, and claims priority under 35 U.S.C. §119 to an application entitled "Proactive User Interface Including Evolving Agent" filed in the Korean Intellectual Property Office on Mar. 10, 2004 and assigned Serial No. 2004-16266, the contents of each of which are incorporated herein by reference.

BACKGROUND OF INVENTION

1. Field of the Invention

The present invention relates to a proactive user interface including an evolving agent, and systems and methods thereof, particularly for use with mobile information devices.

2. Description of Related Art

The use of mobile and portable wireless devices has expanded dramatically in recent years. Many such devices having varying functions, internal resources, and capabilities now exist, and include, but are not limited to, mobile telephones, personal digital assistants, medical and laboratory instrumentation, smart cards, and set-top boxes. All such devices can be referred to are mobile information devices. The devices tend to be special purpose, limited-function devices, rather than the general-purpose personal computer. Many of these devices are connected to the Internet, and are used for a variety of applications.

One example of such a mobile information device is the cellular telephone. Cellular telephones are fast becoming ubiquitous; and the use of cellular telephones is even surpassing that of traditional PSTN (public switched telephone network) telephones or "land line" telephones. Cellular telephones themselves are becoming more sophisticated, and in fact are actually computational devices with embedded operating systems.

As cellular telephones become more sophisticated, the range of functions that they offer is also potentially becoming more extensive. However, currently available functions are typically related to extensions of functions already present in regular (land line) telephones, and/or the merging of certain functions of personal digital assistants (PDAs) with those of cellular telephones. The user interface provided with cellular telephones is similarly non-sophisticated, typically featuring a keypad for scrolling through a few simple menus. Customization, although clearly desired by customers who have spent significant amounts of money on personalized ring tones and other cellular telephone accessories, is still limited to a very few functions of the cellular telephone. Furthermore, cellular telephones currently lack any automatic personalization, for example the user interface and custom/tailored functionalities that are required for better use of the mobile information device, and/or the ability to react according to the behavior of the user.

This lack of sophistication, however, is also seen with user interfaces for personal (desk top or laptop) computers and other computational devices. These computational devices can also only be customized in very simple ways. Such customization must be performed by the user, who may not understand computer functions and/or may not feel comfortable with performing such customization tasks. Currently, computational devices do not learn patterns of user behavior and adjust their own behavior accordingly, as adaptive systems for the user interface. If the user cannot manually adjust the computer, then the user must adjust his/her behavior to accommodate the computer, rather than vice versa.

Software which is capable of learning has been developed, albeit only for specialized laboratory functions. For example, "artificial intelligence" (AI) software has been developed. The term "AI" has been given a number of definitions. "AI is the study of the computations that make it possible to perceive, reason, and act."(Artificial Intelligence A Modern Approach (second edition) by Stuart Russell, Peter Norvig (Prentice Hall, Pearson Education Inc, 2003). AI software combines several different concepts, such as perception, which provides an interface to the world in which the AI software is required to reason and act. Examples include but are not limited to, natural language processing—communicating, understanding document content and context of natural language; computer vision—perceive objects from imagery source; and sensor systems—perception of objects and features of perceived objects analyzing sensory data, etc.

Another important concept is that of the knowledge base. Knowledge representation is responsible for representing, extracting and storing knowledge. This discipline also provides techniques to generalize knowledge, feature extraction and enumeration, object state construction and definitions. The implementation itself may be performed by commonly using known data structures, such as graphs, vectors, tables, etc.

Yet another important concept is that of reasoning. Automated reasoning combines the algorithms that use the knowledge representation and perception to draw new conclusions, infer questions and answers, and achieve the agent goals. The following conceptual frameworks are examples of AI reasoning: rule bases—system rules are evaluated against the knowledge base and perceived state for reasoning; search systems—the use of well known data structures for searching for an intelligent conclusion according to the perceived state, the available knowledge and goal (examples include decision trees, state graphs, minimax decision etc); classifiers—the target of the classifier reasoning system is to classify a perceived state represented as an experiment that has no classification tag. According to a pre-classified knowledge base the classifier will infer the classification of the new experiment (examples include vector distance heuristics, Support Vector Machine, Classifier Neural Network etc).

Another important concept is for learning. The target of learning is improving the potential performance of the AI reasoning system by generalization over experiences. The input of a learning algorithm will be the experiment and the output would be modifications of the knowledge base according to the results (examples include Reinforcement learning, Batch learning, Support Vector Machine etc).

Work has also been done for genetic algorithms and evolution algorithms for software. One example of such software is described in "Evolving Virtual Creatures", by Karl Sims (*Computer Graphics*, SIGGRAPH '94 Proceedings, July 1994, pp. 15-22). This reference described software "creatures" which could move through a three-dimensional virtual world, which is a simulated version of the actual physical world. The creatures could learn and evolve by using genetic algorithms, thereby changing their behaviors without directed external input. These genetic algorithms therefore delineated a hyperspace of potential behaviors having different "fitness" or rewards in the virtual world. The algorithms themselves were implemented by using directed graphs, which describe both the genotypes (components) of the creatures, and their behavior.

At the start of the simulation, many different creatures with different genotypes are simulated. The creatures are allowed to alter their behavior in response to different stimuli in the virtual world. At each "generation", only certain creatures are allowed to survive, either according to a relative or absolute cut-off score, with the score being determined according to the fitness of the behavior of the creatures. Mutations are permitted to occur, which may increase the fitness (and hence survivability) of the mutated creatures, or vice versa. Mutations are also performed through the directed graph, for example by randomly changing a value associated with a node, and/or adding or deleting nodes. Similarly, "mating" between creatures may result in changes to the directed graph.

The results described in the reference showed that in fact virtual creatures could change and evolve. However, the creatures could only operate within their virtual world, and had no point of reference or contact with the actual physical world, and/or with human computer operators.

SUMMARY OF THE INVENTION

The background art does not teach or suggest a system or method for enabling intelligent software at least for mobile information devices to learn and evolve specifically for interacting with human users. The background art also does not teach or suggest an intelligent agent for a mobile information device, which is capable of interacting with a human user through an avatar. The background art also does not teach or suggest a proactive user interface for a mobile device, in which the proactive user interface learns the behavior of the user and is then able to actively suggest options for evolution of the agent to the user. The background art also does not teach or suggest an agent for a mobile information device, which uses an avatar to interact with another avatar of another mobile information device or the user thereof.

The present invention overcomes these deficiencies of the background art by providing a proactive user interface, which could optionally be installed in (or otherwise control and/or be associated with) any type of computational device. The proactive user interface would actively suggest options for evolution of the agent to the user, based upon prior experience with a particular user and/or various preprogrammed patterns from which the computational device could select, depending upon user behavior. These suggestions could optionally be made by altering the appearance of at least a portion of the display, for example by changing a menu or a portion thereof; providing different menus for display; and/or altering touch screen functionality. The suggestions could also optionally be made audibly. Other types of suggestions or delivery mechanisms are possible.

By "suggestion" it should be noted that the system could actually execute the action automatically, given certain user preferences and also depending upon whether the system state allows the specific execution of the action.

Generally, it is important to emphasize that the proactive user interface preferably at least appears to be intelligent and interactive, and is preferably capable of at least somewhat "free" (e.g. non-scripted or partially scripted) communication with the user. An intelligent appearance is important in the sense that the expectations of the user are preferably fulfilled for interactions with an "intelligent" agent/device. These expectations may optionally be shaped by such factors as the ability to communicate, the optional appearance(s) of the interface, the use of anthropomorphic attribute(s) and so forth, which are preferably used to increase the sense of intelligence in the interactions between the user and the proactive user interface. In terms of communication received from the user, the proactive user interface is preferably able to sense how the user wants to interact with the mobile information device. Optionally, communication may be in only one direction; for example, the interface may optionally present messages or information to the user, but not receive information from the user, or alternatively the opposite may be implemented. Preferably, communication is bi-directional for preferred interactions with the user.

Adaptiveness is preferably present, in order for the intelligent agent to be able to alter behavior at least somewhat for satisfying the request or other communication of the user. Even if the proactive user interface does not include an intelligent agent for communicating with the user, adaptiveness enables the interface to be proactive. Observation of the interaction of the user with the mobile information device enables such adaptiveness to be performed, although the reaction of the proactive user interface to such observation may be guided by a knowledge base and/or a rule base.

As a specific, non-limiting but preferred example of such adaptiveness, particularly for a mobile information device which includes a plurality of menus, such adaptiveness may include the ability to alter at least one aspect of the menu. For example, one or more shortcuts may be provided, enabling the user to directly reach a menu choice while by-passing at least one (and more preferably all) of the previous menus or sub-menus which are higher in the menu hierarchy than the final choice. Optionally (alternatively or additionally), one or more menus may be rearranged according to adaptiveness of the proactive user interface, for example according to frequency of use. Such a rearrangement may include moving a part of a menu, such as a menu choice and/or a sub-menu, to a new location that is higher in the menu hierarchy than the current location. Sub-menus which are higher in a menu hierarchy are reached more quickly, through the selection of fewer menu choices, than those which are located in a lower (further down) location in the hierarchy.

Adaptiveness is assisted through the use of rewards for learning by the proactive user interface. Suggestions or actions of which the user approves provide a reward, or a positive incentive, to the proactive interface to continue with such suggestions or actions; disapproval by the user causes a disincentive to the proactive user interface to continue such behavior(s). Providing positive or negative incentives/disincentives to the proactive user interface preferably enables the behavior of the interface to be more nuanced, rather than a more "black or white" approach, in which a behavior would either be permitted or forbidden. Such nuances are also preferred to enable opposing or contradictory behaviors to be handled, when such behaviors are collectively approved/disapproved by the user to at least some extent.

Non-limiting examples of such computational devices include automated teller machines (ATM's) (this also has security implications, as certain patterns of user behavior could set off an alarm, for example), regular computers of any type (such as desktop, laptop, thin clients, wearable computers and so forth), mobile information devices such as cellular telephones, pager devices, other wireless communication devices, regular telephones having an operating system, PDA's and wireless PDA's, and consumer appliances having an operating system. Hereinafter, the term "computational device" includes any electronic device having an operating system and being capable of performing computations. The operating system may be an embedded system and/or another type of software and/or hardware run time environment. Hereinafter, the term "mobile information device" includes, but is not limited to, any type of wireless communication device, including, but not limited to, cellular telephones, wireless pagers, wireless PDA's and the like.

The present invention is preferably implemented in order to provide an enhanced user experience and interaction with the computational device, as well as to change the current generic, non-flexible user interface of such devices into a flexible, truly user friendly interface. More preferably, the present invention implements the user interface in the form of an avatar which would interact with the user.

Either or both of the mobile information device adaptive system and proactive user interfaces may be implemented with genetic algorithms, artificial intelligence (AI) algorithms, machine learning (ML) algorithms, learned behavior, and software/computational devices which are capable of evolution. Either or both may also provide an advanced level of voice commands, touch screen commands, and keyboard 'short-cuts'.

According to another preferred embodiment of the present invention, there is provided one or more intelligent agents for use with a mobile information device over a mobile information device network, preferably including an avatar (or "creature"; hereinafter these terms are used interchangeably) through which the agent may communicate with the human user. The avatar can provide a user interface for interacting with the user. The intelligent agent can also include an agent for controlling at least one interaction of the mobile information device over the network. This embodiment may include a plurality of such intelligent agents being connected over the mobile information device network, thereby forming a network of such agents. Various applications may also be provided through this embodiment, including but not limited to teaching in general and/or for learning how to use the mobile information device in particular, teaching languages, communication applications, community applications, games, entertainment, shopping (getting coupons, etc), locating a shop or another place, filtering advertisements and other non-solicited messages, role-playing or other interactive games over the cell phone network, "chat" and meeting functions, the ability to buy "presents" for the intelligent agents and otherwise accessorize the character, and so forth. In theory, the agents themselves could be given "pets" as accessories.

The intelligent agents could also assist in providing various business/promotional opportunities for the cell phone operators. The agents could also assist with installing and operating software on cell phones, which is a new area of commerce. For example, the agents could assist with the determination of the proper type of mobile information device and other details that are essential for correctly downloading and operating software.

Therefore, a number of different interactions are possible according to the various embodiments of the present invention. These interactions include any one or more of an interaction between the user of the device and an avatar or other character or personification of the device; an interaction between the user of the device and the device, for operating the device, through the avatar or other character or personification; interactions between two users through their respective devices, by communicating through the avatar, or other character or personification of the device; and interactions between two devices through their respective intelligent agents, and can be done without any communication between users or even between the agent and the user. The interaction or interactions that are possible are determined according to the embodiment of the present invention, as described in greater detail below.

The present invention benefits from the relatively restricted environment of a computational device and/or a mobile information device, such as a cellular telephone for example, because the parameters of such an environment are known in advance. Even if such devices are communicating through a network, such as a cellular telephone network for example, the parameters of the environment can still be predetermined. The current computational devices only provide a generic interface, with little or no customization permitted by even manual, direct intervention by the user.

It should be noted that the term "software" may also optionally include firmware or instructions operated by hardware.

BRIEF DESCRIPTION OF THE DRAWINGS

The invention is herein described, by way of example only, with reference to the accompanying drawings, wherein:

FIG. 22 is a block diagram of an exemplary implementation of an action selection system according to the present invention.

DESCRIPTION OF THE PREFERRED EMBODIMENTS

Figure 1:
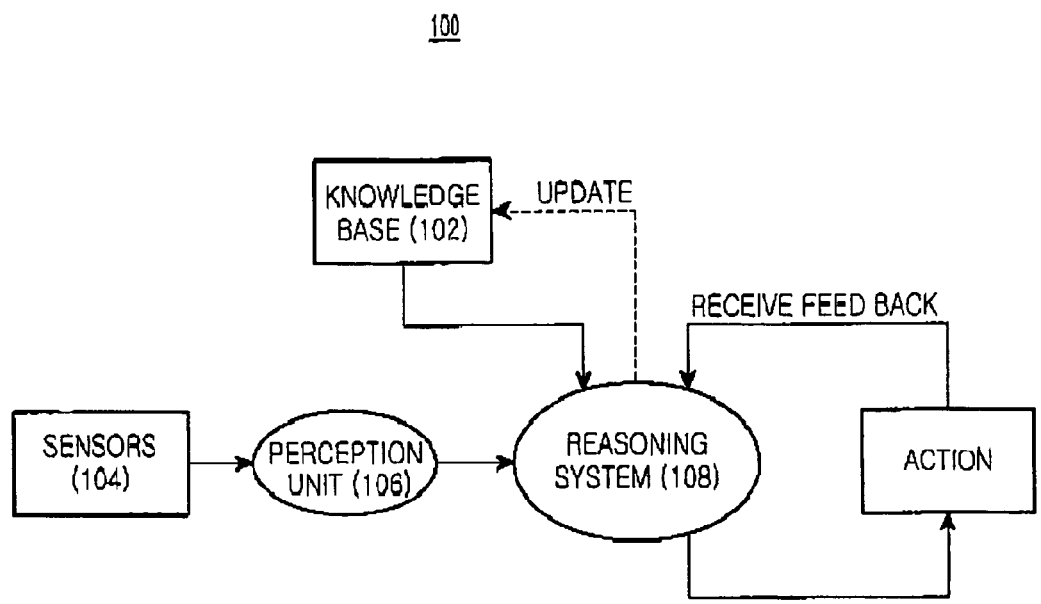
FIG. 1 is a block diagram of an exemplary learning module according to the present invention.

Preferred embodiments of the present invention will be described herein below with reference to the accompanying drawings. In the following description, well-known functions or constructions are not described in detail since they would obscure the invention in unnecessary detail.

The present invention is of a proactive user interface, which could optionally be installed in (or otherwise control and/or be associated with) any type of computational device.

The proactive user interface is preferably implemented for a computational device, as previously described, which includes an operating system. The interface can include a user interface for communicating between the user and the operating system. The interface can also include a learning module for detecting at least one pattern of interaction of the user with the user interface and for actively suggesting options for evolution of at least one function of the user interface to the user, according to the detected pattern. Therefore, the proactive user interface can anticipate the requests of the user and thereby assist the user in selecting a desired function of the computational device.

At least one pattern can be selected from the group consisting of a pattern determined according to at least one previous interaction of the user with the user interface, and a predetermined pattern, or a combination thereof. The first type of pattern represents learned behavior, while the second type of pattern may be preprogrammed or otherwise predetermined, particularly for assisting the user when a particular computational device is first being operated by the user. A third type of pattern could combine these two aspects, and would enable the pattern to be at least partially determined according to the user behavior, but not completely; for example, the pattern selection may be guided according to a plurality of rules, and/or according to a restrictive definition of the possible world environment state and/or the state of the device and/or user interface. The pattern includes a pattern of the user's preferences for the appearance, function or characteristic of the intelligent agent.

The user interface preferably features a graphical display, such that at least one function of the graphical display is proactively altered according to the pattern. For example, at least a portion of the graphical display may be altered, for example by selecting a menu for display according to the detected pattern; and displaying the menu. The menu may be selected by constructing a menu from a plurality of menu options, for example in order to create a menu "on the fly".

The user interface may feature an audio display, such that altering at least one function of the user interface involves altering at least one audible sound produced by the computational device.

The proactive user interface could be implemented according to a method of the present invention, which is preferably implemented for a proactive interaction between a user and a computational device through a user interface. The method preferably includes detecting a pattern of user behavior according to at least one interaction of the user with the user interface; and proactively altering at least one function of the user interface according to the pattern. The pattern includes a pattern of user preferences for the appearance, function or characteristic of the intelligent agent.

According to another embodiment of the present invention, there is provided a mobile information device which includes an adaptive system. Like the user interface above, it also relies upon prior experience with a user and/or preprogrammed patterns. However, the adaptive system can be more restricted to operating within the functions and environment of a mobile information device, such as a cellular telephone for example, which currently may also include certain basic functions from a PDA.

The adaptive system preferably operates with a mobile information device featuring an operating system. The operating system can comprise an embedded system. The mobile information device can comprise a cellular telephone.

The adaptive system is preferably able to analyze the user behavior by analyzing a plurality of user interactions with the mobile information device, after which more preferably the adaptive system compares the plurality of user interactions to at least one predetermined pattern, to see whether the predetermined pattern is associated with altering at least one function of the user interface. The analysis may also include comparing the plurality of user interactions to at least one pattern of previously detected user behavior, wherein the pattern of previously detected user behavior is associated with altering at least one function of the user interface.

The adaptive system may be operated by the mobile information device itself. Alternatively, if the mobile information device is connected to a network, the adaptive system may be operated at least partially according to commands sent from the network to the mobile information device. For this implementation, data associated with at least one operation of the adaptive system is stored at a location other than the mobile information device, in which the location is accessible through the network.

According to preferred embodiments of the present invention, the adaptive system also includes a learning module for performing the analysis according to received input information and previously obtained knowledge. Such knowledge may have been previously obtained from the behavior of the user, and/or may have been communicated from another adaptive system in communication with the adaptive system of the particular mobile information device. The adaptive system can adapt to user behavior according to any one or more of an AI algorithm, a machine learning algorithm, or a genetic algorithm.

According to another optional but preferred embodiment of the present invention, there is provided one or more intelligent agents for use with a mobile information device over a mobile information device network, preferably including an avatar through which the agent may communicate with the human user. The avatar can therefore provide a user interface for interacting with the user. The intelligent agent can also include an agent for controlling at least one interaction of the mobile information device over the network. This embodiment may include a plurality of such avatars being connected over the mobile information device network.

According to preferred embodiments of the present invention, at least one characteristic of an appearance of the avatar can be altered, for example according to a user command. A plurality of characteristics of an appearance of avatar can be altered according to a predefined avatar skin. The skin can be predefined by the user. By "skin" it is meant that a plurality of the characteristics is altered together as a set, in which the set forms the skin. If this embodiment is combined with the previous embodiment of having at least a portion of the data related to the avatar being stored at a network-accessible location, then the user could move the same avatar onto different phones, and/or customize the appearance of the avatar for different reasons, for example for special occasions such as a party or other celebration. Of course, these are only intended as examples and are not meant to be limiting in any way.

According to other embodiments of the present invention, at least one characteristic of an appearance of the avatar can be altered according to an automated evolutionary algorithm, for example a genetic algorithm. The evolutionary algorithm is one non-limiting example of a method for providing personalization of the avatar for the user. Personalization may also be performed through direct user selection of one or more characteristics or skins (groups of characteristics). Such personalization is desirable at least in part because it enhances the emotional experience of the user with the avatar and hence with the mobile information device.

In terms of technical implementation, the present invention is preferably capable of operating on a limited system (in terms of memory, data processing capacity, screen display size and resolution, and so forth) in a device which is also very personal to the user. For example, the device is a mobile information device, such as a cellular telephone, which by necessity is adapted for portability and ease of use, and therefore may have one or more, or all, of the above limitations. The implementation aspects of the present invention are preferably geared to this combination of characteristics. Therefore, in order to overcome the limitations of the device itself while still maintaining the desirable personalization and "personal feel" for the user, various solutions are proposed below. It should be noted that these solutions are examples only, and are not meant to be limiting in any way.

EXAMPLE 1

Proactive Interface—General

The proactive user interface of the present invention is preferably able to control and/or be associated with any type of computational device, in order to actively make suggestions to the user, based upon prior experience with a particular user and/or various preprogrammed patterns from which the computational device could select, depending upon user behavior. These suggestions could be made by altering the appearance of at least a portion of the display, for example by changing a menu or a portion thereof; providing different menus for display; and/or altering touch screen functionality. The suggestions could also be made audibly.

The proactive user interface is preferably implemented for a computational device, as previously described, which includes an operating system. The interface can include a user interface for communicating between the user and the operating system. The interface is preferably able to detect at least one pattern of interaction of the user with the user interface, for example through operation of a learning module and would therefore be able to proactively alter at least one function of the user interface according to the detected pattern. The proactive user interface can anticipate the requests of the user and thereby assist the user in selecting a desired function of the computational device.

This type of proactive behavior, particularly with regard to learning the behavior and desires of the user, requires some type of learning capability on the part of the proactive interface. Such learning capabilities may be provided through algorithms and methodologies which are known in the art, relating to learning (by the software) and interactions of a software object with the environment. Software can be said to be learning when it can improve its actions over a period of time. Artificial Intelligence needs to demonstrate intelligent action selection (reasoning), such that the software has the ability to explore its environment (its "world") and to discover action possibilities. The software would also have the ability to represent the world's state and its own internal state. The software would then be able to select an intelligent action (using the knowledge above) and to act.

Learning, for example by the learning module of the interface, can be reinforced by rewards, in which the learning module is rewarded for taking particular actions according to the state of the environment. This type of learning actually involves training the learning module to behave in a certain manner. If more than one behavior is allowed, then the learning process is non-deterministic and can create different behaviors. With regard to the proactive user interface, for example, the reward includes causing the learning module to detect when an offered choice leads to a user selection, as opposed to when an offered choice causes the user to seek a different set of one or more selections, for example by selecting a different menu than the one offered by the proactive user interface. Clearly, the proactive user interface should seek to maximize the percentage of offerings which lead to a direct user selection from that offering, as this shows that the interface has correctly understood the user behavior.

FIG. 1 is a block diagram of an exemplary learning module according to the present invention for reactive learning. As shown, a learning module 100 includes a Knowledge Base 102, which acts as the memory of learning module 100, by holding information gathered by the learning module 100 as a result of interactions with the environment. Knowledge Base 102 may be stored in non-volatile memory (not shown). Knowledge Base 102 stores information that assists the learning module 100 to select the appropriate action. This information can include values such as numerical weights for an inner neural net, or a table with action reward values, or any other type of information.

In order for learning module 100 to be able to receive information related to the environment, the learning module 100 features a plurality of sensors 104. The sensors 104 allow the learning module 100 to perceive its environment state. The sensors 104 are connected to the environment and output sensed values. The values can come from the program itself (for example, position on screen, energy level, etc.), or from real device values (for example, battery value and operating state, such as a flipper state for cellular telephones in which the device can be activated or an incoming call answered by opening a "flipper").

Sensors 104 clearly provide valuable information; however, this information needs to be processed before the learning module 100 can comprehend it. Therefore, the learning module 100 also includes a perception unit 106, for processing the current output of the sensors 104 into a uniform representation of the world, called a "state". The state is then the input to a reasoning system 108, which may be described as the "brain" of learning module 100. This design supports the extension of the world state and the sensor mechanism, as well as supporting easy porting of the system to several host platforms (different computational devices and environments), such that the world state can be changed according to the device.

The reasoning system 108 processes the current state with the Knowledge Base 102, thereby producing a decision as to which action to perform. The reasoning system 108 receives the current state of the world, outputs the action to be performed, and receives feedback on the action selected. Based on the feedback, the reasoning system 108 updates the Knowledge Base 102. This is an iterative process in which learning module 100 learns to associate actions to states.

According to another embodiment of the present invention, the computational device may feature one or more biological sensors, for sensing various types of biological information about the user, such as emotional state, physical state, movement, etc. This information may then be fed to the sensors 104 for assisting the perception unit 106 in a determination of the state of the user, and hence to determine the proper state for the device. Such biological sensors may include but are not limited to sensors for body temperature, heart rate, oxygen saturation or any other type of sensor which measures biological parameters of the user.

Figure 2:
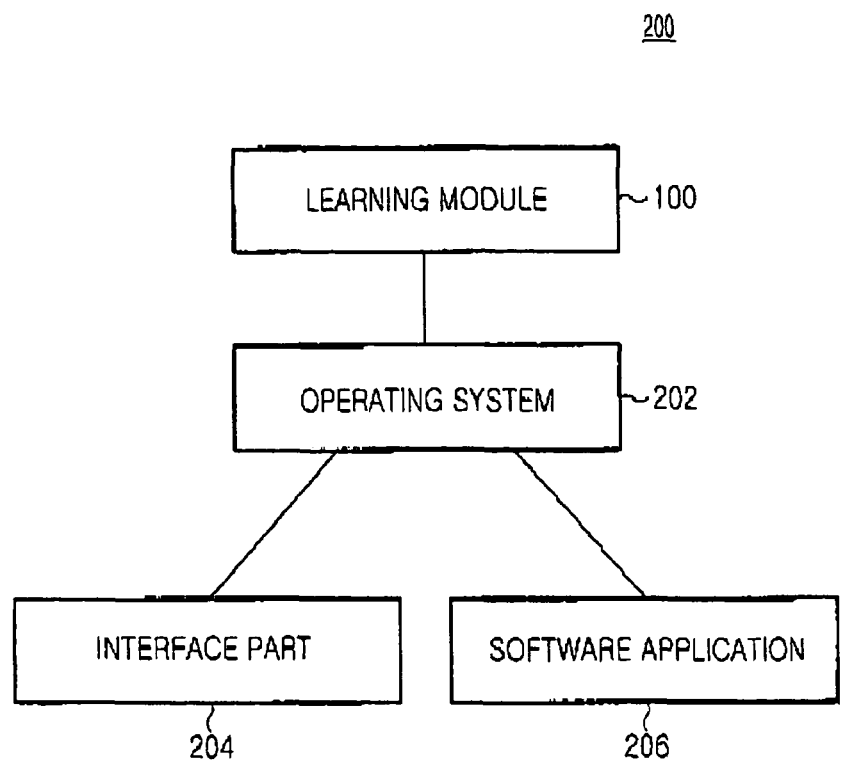
FIG. 2 is a block diagram of an exemplary system according to the present invention for using the proactive user interface.

FIG. 2 shows an exemplary embodiment of a system 200 according to the present invention for providing the proactive user interface, again featuring the learning module 100. The learning module 100 is shown communicating with an operating system 202 of the computational device (not shown) with which the learning module 100 is associated and/or controls and/or by which the learning module 100 is operated. The operating system 202 controls the operation of an interface part 204 and also at least one other software application 206 (although of course many such software applications may optionally be present).

The user communicates through interface part 204, for example by selecting a choice from a menu. The operating system 202 enables this communication to be received and translated into data. The learning module 100 then preferably receives such data, and can send a command back to the operating system 202, for example to change some aspect of the interface part 204 (for example by offering a different menu), and/or to operate the software application 206. The user then responds through the interface part 204; from this response, the learning module 100 learns whether or not the action (command that was sent by learning module 100) was appropriate.

Figure 3:
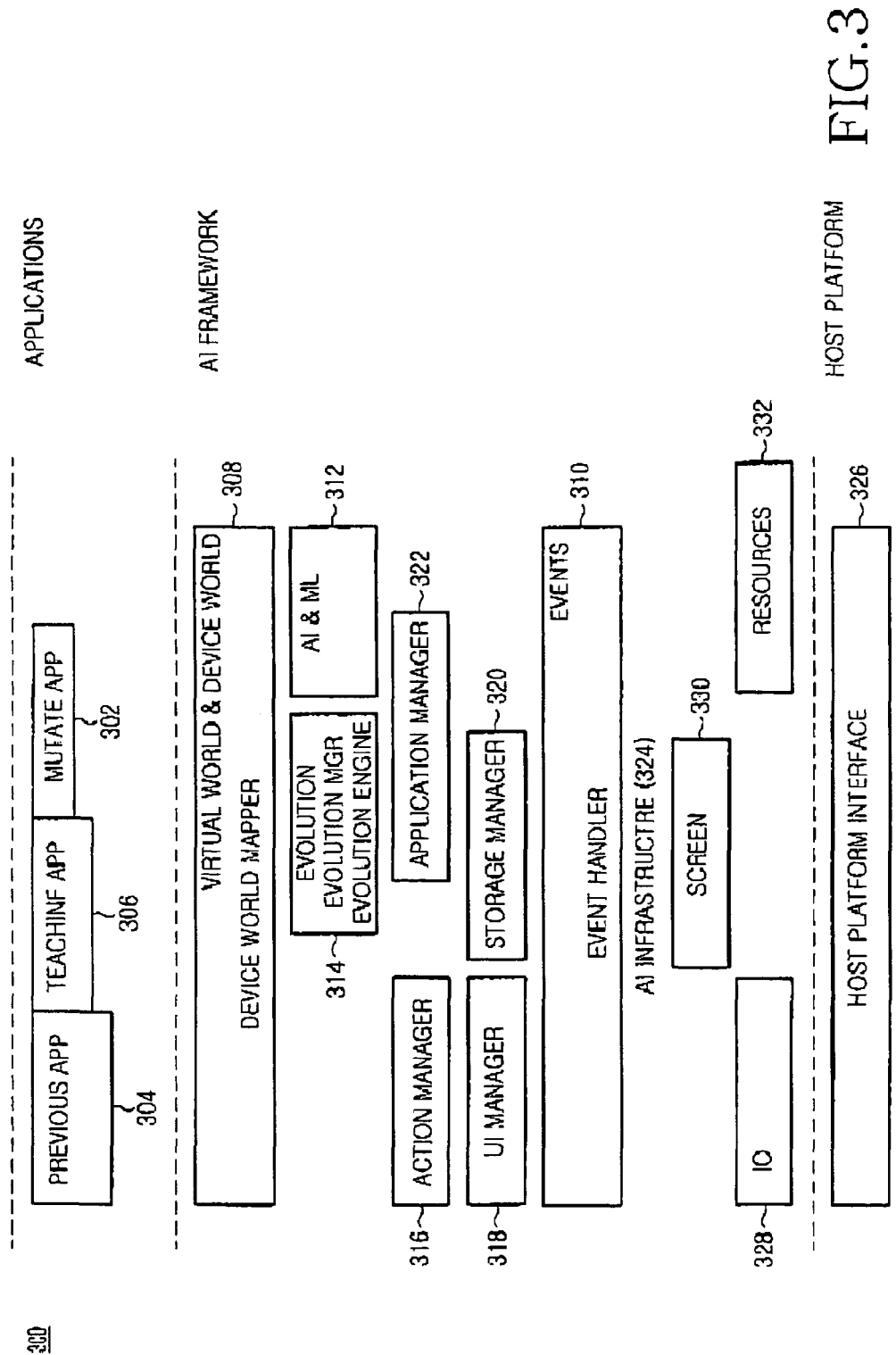
FIG. 3 shows an exemplary implementation of a proactive user interface system according to the present invention.

FIG. 3 is a block diagram showing an exemplary implementation of a proactive user interface system 300 according to the present invention. As shown, system 300 features a three level architecture, with an application layer being supported by an AI (artificial intelligence) framework, which in turn communicates with the host platform computational device (shown as "host platform").

The application layer features a plurality of different applications, of which a few non-limiting examples are shown, such as a MutateApp 302, a PreviousApp 304 and a TeachingApp 306.

The MutateApp 302 is invoked in order to control and/or initiate mutations in the system 300. As noted above, the learning module can optionally change its behavior through directed or semi-directed evolution, for example through genetic algorithms. The MutateApp 302 controls and/or initiates such mutations through evolution. The embodiment of evolution is described in greater detail below.

The PreviousApp 304 enables a prior state of the system 300, or a portion thereof (such as the state of the learning module) to be invoked in place of the current state. More specifically, the PreviousApp 304 enables the user to return to the previous evolutionary step if the present invention is being implemented with an evolutionary algorithm. More generally, the system 300 is preferably stateful and therefore can return to a previous state, as a history of such states is preferably maintained.

The TeachingApp 306 is only one non-limiting example of a generic application which may be implemented over the AI framework layer.

The AI framework layer itself contains one or more components which enable the user interface to behave in a proactive manner. The framework can include a DeviceWorldMapper 308, for determining the state of the computational device and also that of the virtual world, as well as the relationship between the two states. The DeviceWorldMapper 308 receives input, for example from various events from an EventHandler 310, in order to determine the state of the virtual world and that of the device.

The DeviceWorldMapper 308 also communicates with an AI/ML (machine learning) module 312 for analyzing input data. The AI/ML module 312 also determines the behavior of the system 300 in response to various stimuli, and also enables the system 300 to learn, for example from the response of the user to different types of user interface actions. The behavior of the system 300 may also be improved according to an evolution module 314.

The embodiment of evolution is particularly preferred with regard to the use of an intelligent agent on a mobile information device (see below for an example), but may also be used with any proactive user interface for a computational device. This embodiment is used when the proactive user interface also features or is used in combination with an avatar.

Evolution can be simulated by a set of genetic algorithms. The basis of these algorithms is describing the properties of the proactive interface (and particularly the avatar's appearance) in term of genes, chromosomes, and phenotypes. The gene is a discrete property that has a level of expression for example a leg of a certain type. The level of the expression can be the number of these legs.

A phenotype is the external expression of a gene; for example the leg gene can have different phenotypes in term of leg length or size.

The gene can go though a mutation process. This process (preferably according to a certain probability) changes one or more parameter of the gene, thereby producing different new phenotypes.

A chromosome is a set of genes that function together. The chromosome can hybridize (cross-breed) with the same type of chromosome from a different creature, thus creating a new chromosome that is a combination of its genetic parent chromosomes.

This methodology helps in creating a generic infrastructure to simulate visual evolution (for example of the appearance of the avatar) and/or evolution of the behavior of the proactive user interface. These algorithms may also be used for determining non-visual behavioral characteristics, such as dexterity, stamina and so on. The effect could result for example in a faster creature, or a more efficient creature. These algorithms may be used for any such characteristics that can be described according to the previously mentioned gene/genotype/phenotype structure, such that for example behavioral genes could optionally determine the behavior of AI algorithms used by the present invention.

The algorithm output preferably provides a variety of possible descendant avatars and/or proactive user interfaces.

The genetic algorithms use a natural selection process to decide which of the genetic children will continue as the next generation. The selection process can be decided by the user or can be predefined. In this way the creature can display interesting evolutional behavior. The generic algorithm framework can be used to evolve genes that encode other non visual properties of the creature, such as goals or character.

The evolution module 314 supports and also preferably manages such evolution, for example through the operation of the MutateApp 302.

Between these different AI-type applications and the EventHandler 310, one or more different low level managers preferably support the receipt and handling of different events, and also the performance of different actions by the system 300. These managers may include but are not limited to, an ActionManager 316, a UIManager 318, a StorageManager 320 and an ApplicationManager 322.

The ActionManager 316 is described in greater detail below, but briefly enables the system 300 to determine which action should be taken, for example through the operation of the AI/ML module 312.

The UIManager 318 manages the appearance and functions of the user interface, for example by directing changes to that interface as previously described.

The StorageManager 320 manages the storage and handling of data, for example with regard to the knowledge base of the system 300 (not shown).

The ApplicationManager 322 handles communications with the previously described applications in the application layer.

All of these different managers receive events from the EventHandler 310.

Within the AI framework layer, an AI infrastructure 324 supports communication with the host platform. The host platform itself features a host platform interface 326, which may be provided through the operating system of the host platform for example.

The AI infrastructure 324 can include an I/O module 328, for receiving inputs from the host platform interface 326 and also for sending commands to the host platform interface 326. A screen module 330 handles the display of the user interface on the screen of the host platform computational device. A resources module 332 enables the system 300 to access various host platform resources, such as data storage and so forth.

Of course, the above Figures represent only one optional configuration for the learning module. For example, the learning module may also be represented as a set of individual agents, in which each agent has a simple goal. The learning module chooses an agent to perform an action based on the current state. The appropriate mapping between the current state and agents can also be learned by the learning module with reinforcement learning.

EXAMPLE 2

Adaptive System for Mobile Information Device

This example relates to the illustrative implementation of an adaptive system of the present invention with a mobile information device, although it should be understood that this implementation is preferred but optional, and is not intended to be limiting in any way.

The adaptive system may optionally include any of the functionality described above in Example 1, and may also be implemented as previously described. This Example focuses more on the actual architecture of the adaptive system with regard to the mobile information device operation. Also, this Example describes an optional but preferred implementation of the creature or avatar according to the present invention.

The next sections describe optional but preferred embodiments of specific technical implementations of various aspects of the adaptive system according to the present invention. For the purpose of description only and without any intention of being limiting, these embodiments are based upon the optional but preferred embodiment of an adaptive system interacting with the user through an intelligent agent, optionally visually represented as an avatar or "creature".

Section 1: Event Driven System

This Section describes a preferred embodiment of an event driven system according to the present invention, including but not limited to an application manager, and interactions between the device itself and the system of the present invention as it is operated by the device.

Figure 4:
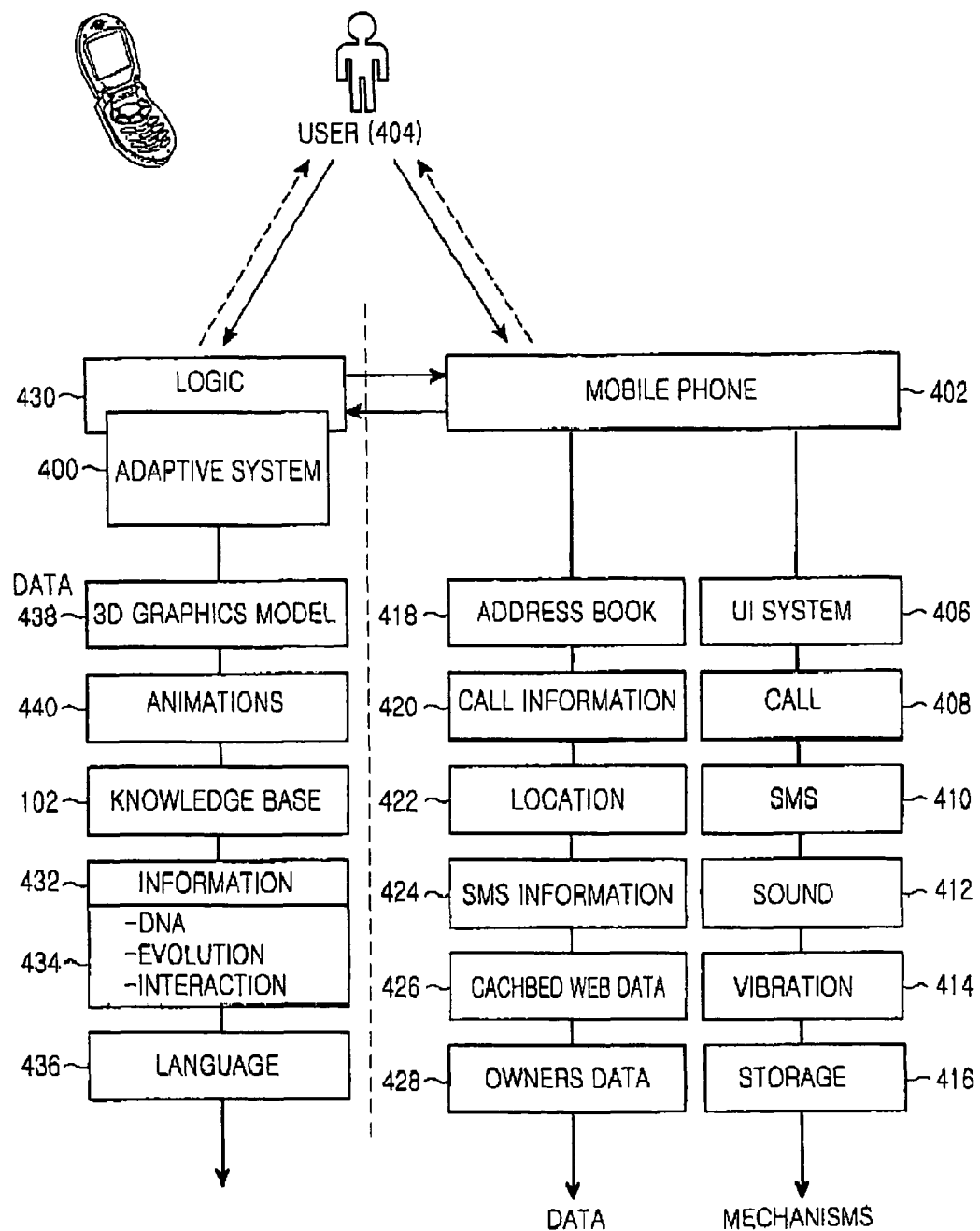
FIG. 4 is a block diagram of an exemplary implementation of the adaptive system according to the present invention.

FIG. 4 is a block diagram of an exemplary adaptive system 400 according to the present invention, and interactions of the system 400 with a mobile information device 402. Also as shown, both the system 400 and the mobile information device 402 interact with a user 404.

The mobile information device 402 has a number of standard functions, which are shown divided into two categories for the purpose of explanation only: data and mechanisms. Mechanisms may include but are not limited to such functions as a UI (user interface) system 406 (screen, keypad or touch-screen input, etc); incoming and outgoing call function 408; messaging function 410 for example for SMS; sound 412 and/or vibration 414 for alerting user 404 of an incoming call or message, and/or alarm, etc; and storage 416.

Data may include such information as an address (telephone) book 418; incoming or outgoing call information 420; the location of the mobile information device 402, shown as location 422; message information 424; cached Internet data 426; and data related to the user 404, shown as owner data 428.

It should be noted that mobile information device 402 may include any one or more of the above data/mechanisms, but does not necessarily need to include all of them, and/or may include additional data/mechanisms that are not shown. These are simply intended as non-limiting examples with regard to the mobile information device 402, particularly for cellular telephones.

The adaptive system 400 according to the present invention preferably interacts with the data/mechanisms of the mobile information device 402 in order to be able to provide an adaptive (and also preferably proactive) user interface, thereby increasing the ease and efficiency with which the user 404 interacts with the mobile information device 402.

The adaptive system 400 features logic 430, which functions in a similar manner as the previously described learning module, and which also operates according to the previously described AI and machine learning algorithms.

The logic 430 is able to communicate with the knowledge base 102 as described with regard to FIG. 1 (components featuring the same reference numbers have either identical or similar functionality, unless otherwise stated). The information storage 432 includes data about the actions of the mobile information device 402, user information and so forth, and preferably supplements the data in the knowledge base 102.

Preferably, the adaptive system 400 is capable of evolution, through an evolution logic 434, which may optionally combine the previously described functionality of the evolution module 314 and the MutateApp 302 of FIG. 3.

The adaptive system 400 is capable of communicating directly with the user 404 through text and/or audible language, as supported by a language module 436.

Particularly as described with regard to the embodiment of the present invention in Example 3 below, but also for the adaptive system 400, the user 404 may be presented with an avatar (not shown) for the user interface. If present, such an avatar may be created through a 3D graphics model 438 and an animation module 440.

Figure 5A:
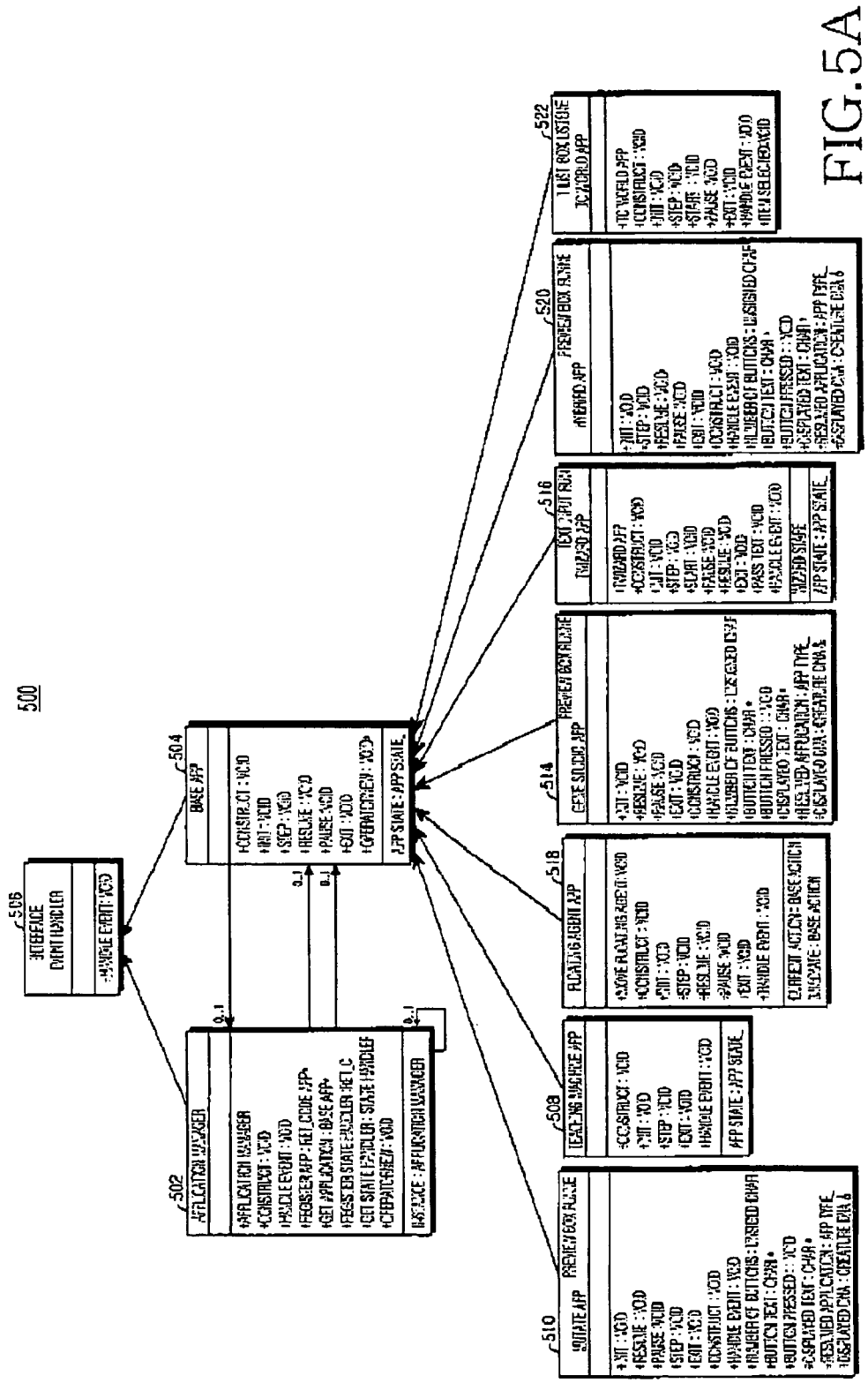
FIGS. 5A and 5B are a block diagram and a sequence diagram, respectively, of an exemplary application management system according to the present invention.

FIG. 5A shows a block diagram of an exemplary application management system 500, which is a core infrastructure for supporting the adaptive system of the present invention. The system 500 may also be used for supporting such embodiments as a teaching application, as previously described and also as described in greater detail below. The system 500 features an application manager 502 for managing the different types of applications which are part of the adaptive system according to the present invention. The application manager 502 communicates with an application interface called a BaseApp 504, which is implemented by all applications in the system 500. Both the application manager 502 and the BaseApp 504 communicate events through an EventHandler 506.

The application manager 502 is responsible for managing and providing runtime for the execution of the system applications (applications which are part of the system 500). The life cycle of each such application is defined in the BaseApp 504, which allows the application manager 502 to start, pause, resume and exit (stop) each such application. The application manager 502 manages the runtime execution through the step method of the interface of BaseApp 504. It should be noted that the step method is used for execution, since the system 500 is stateful, such that each step preferably corresponds (approximately) to one or more states. However, execution could also be based upon threads and/or any type of execution method.

The application manager 502 receives a timer event from the mobile information device. The mobile information device features an operating system, such that the timer event is received from the operating system layer. When a timer is invoked, the application manager 502 invokes the step of the current application being executed. The application manager 502 switches from one application to another application when the user activates a different application, for example when using the menu system.

Some non-limiting examples of the system applications are shown, including but not limited to, a TeachingMachineApp 508, a MutateApp 510, a GeneStudioApp 514, a TWizardApp 516, a FloatingAgentApp 518, a TCWorldApp 522 and a HybridApp 520. These applications are also described in greater detail below with regard to Example 3.

The MutateApp 510 is invoked in order to control and/or initiate mutations in the adaptive system, and/or in the appearance of an avatar representing the adaptive system as a user interface. As noted above with regard to Example 1, the adaptive system of the present invention can change its behavior through directed or semi-directed evolution, for example through genetic algorithms. The MutateApp 510 controls and/or initiates such mutations.

The GeneStudioApp 514 enables the user to perform directed and/or semi-directed mutations through one or more manual commands. For example, the user may wish to direct the adaptive system (through the application management system 500) to perform a particular task sequence upon receiving a particular input. Alternatively, the user may wish to directly change part of the appearance of an avatar, if present. According to the preferred embodiments of the present invention, these different aspects of the adaptive system are implemented by distinct "genes", which can then be altered by the user.

The HybridApp 520 may be invoked if the user wishes to receive information from an external source, such as the adaptive system of another mobile information device, and to merge this information with existing information on the user's mobile information device. For example, the user may wish to create an avatar having a hybrid appearance with the avatar of another mobile information device. The HybridApp 520 also provides the main control of the user on the entire evolutionary state of the avatar. The HybridApp 520 may be used to instruct the user on the "life" properties of with the avatar, which may have a name, personality, behavior and appearance.

The TeachingMachineApp 508 is an illustrative, non-limiting example of an application which may relate to providing instruction on the use of the device itself, but provides instruction on a subject which is not related to the direct operation of the device itself. Therefore, the TeachingMachineApp 508 represents an example of an application which is provided on the mobile information device for a purpose other than the use of the device itself.

The TCWorldApp 522 is an application which runs the intelligent agent, controlling both the intelligent aspects of the agent and also the graphical display of the creature or avatar.

The TWizardApp 516 is another type of application which provides information to the user. It is described with regard to the Start Wizard application in Example 4 below. Briefly, this application contains the user preferences and configuration of the AI framework, such as the character of the intelligent agent, particularly with regard to the emotional system, and also with regard to setting goal priorities.

The FloatingAgentApp 518 controls the appearance of the user interface, particularly with regard to the appearance of an avatar (if present). The FloatingAgentApp 518 enables the visual display aspects of the user interface to be displayed independently of the display of the avatar, which may therefore appear to "float" over the user interface, for example. The FloatingAgentApp 518 is the default application being operated when no other application is running.

Figure 5B:
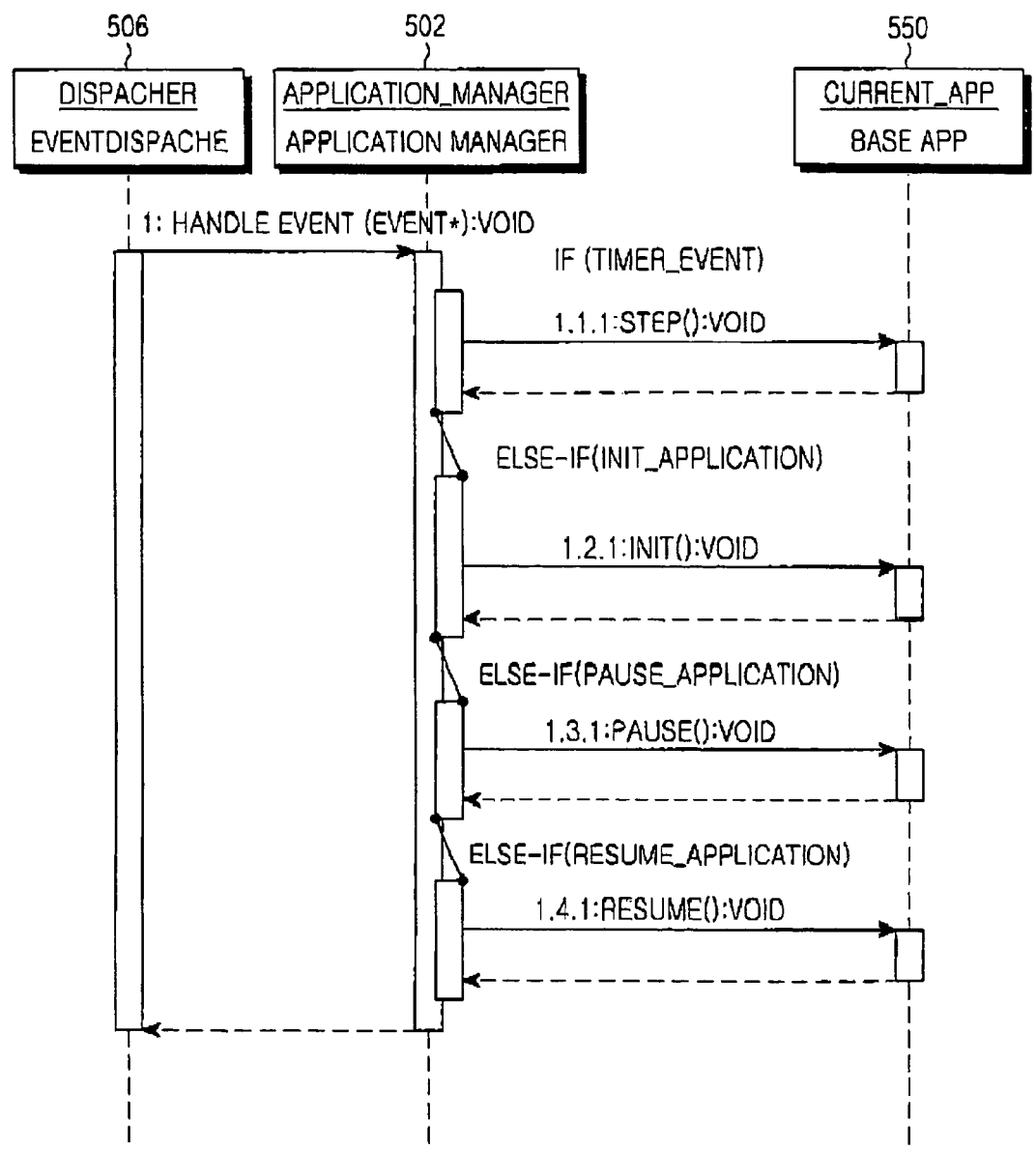

FIG. 5B shows an exemplary sequence diagram for the operations of the application manager according to the present invention. As shown, an EventHandler 506 dispatches a notification of an event to the application manager 502, as shown in arrow 1. If the event is a timer event, then the application manager 502 invokes the step (action) of the relevant application that was already invoked, as shown in arrow 1.1.1. If the event is to initiate the execution of an application, then the application manager 502 invokes the relevant application, as shown in arrow 1.2.1. If a currently running application is to be paused, then the application manager 502 sends the pause command to the application, as shown in arrow 1.3.1. If a previously paused application is to be resumed, then the application manager 502 sends the resume command to the application, as shown in arrow 1.4.1. In any case, successful execution of the step is returned to the application manager 502, as shown by the relevant return arrows above. The application manager 502 then notifies the EventHandler 506 of the successful execution, or alternatively of the failure.

These different applications are important for enabling the adaptive system to control various aspects of the operation of the mobile information device. However, the adaptive system also needs to be able to communicate directly with various mobile information device components, through the operating system of the mobile information device. Such communication may be performed through a communication system 600, shown with regard to FIG. 6, preferably with the action algorithms described below.

Figure 6A:
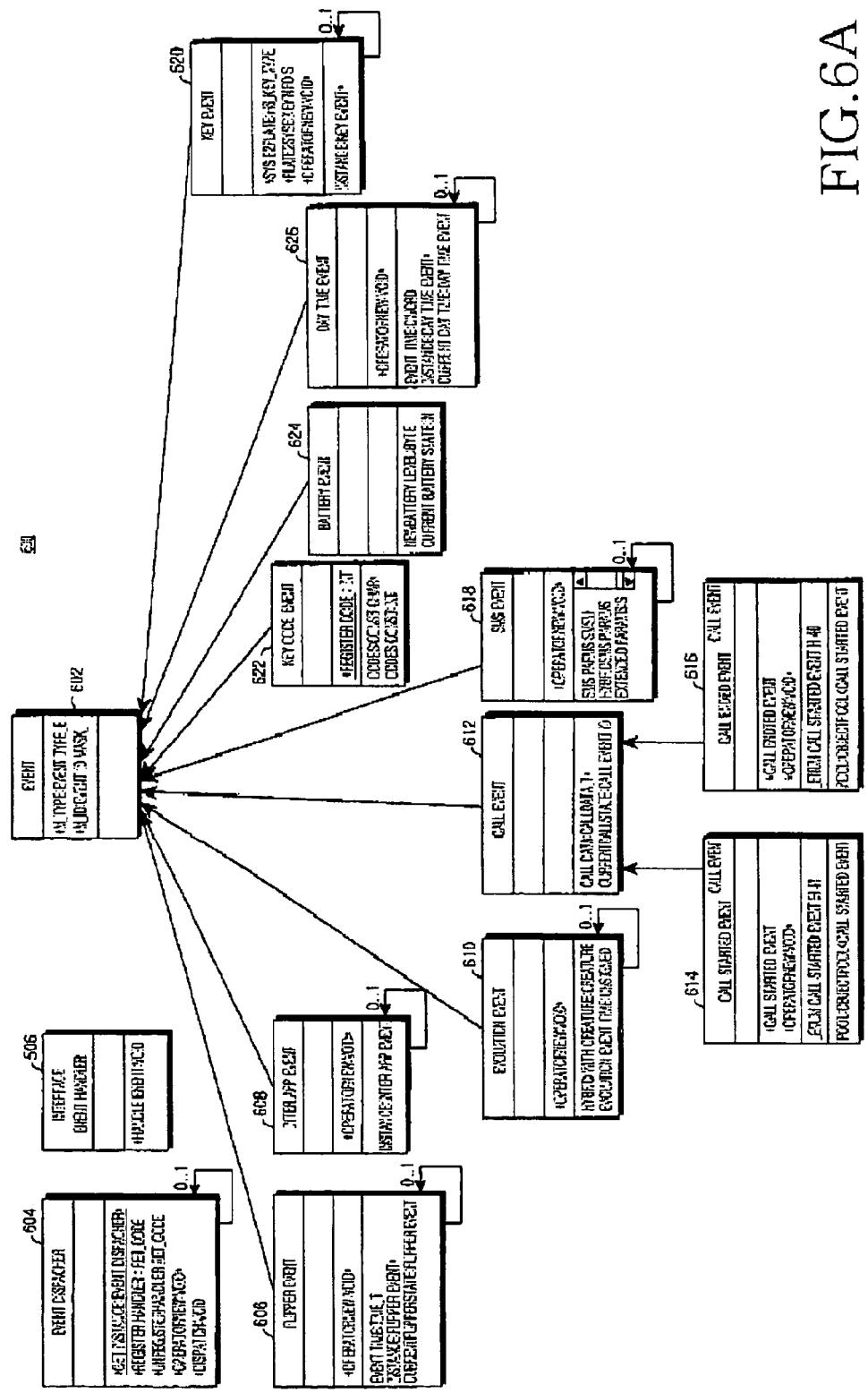
FIGS. 6A and 6B show an exemplary infrastructure required for the adaptive system according to the present invention to perform one or more actions through the operating system of the mobile information device and an exemplary sequence diagram thereof according to the present invention.
Figure 6B:
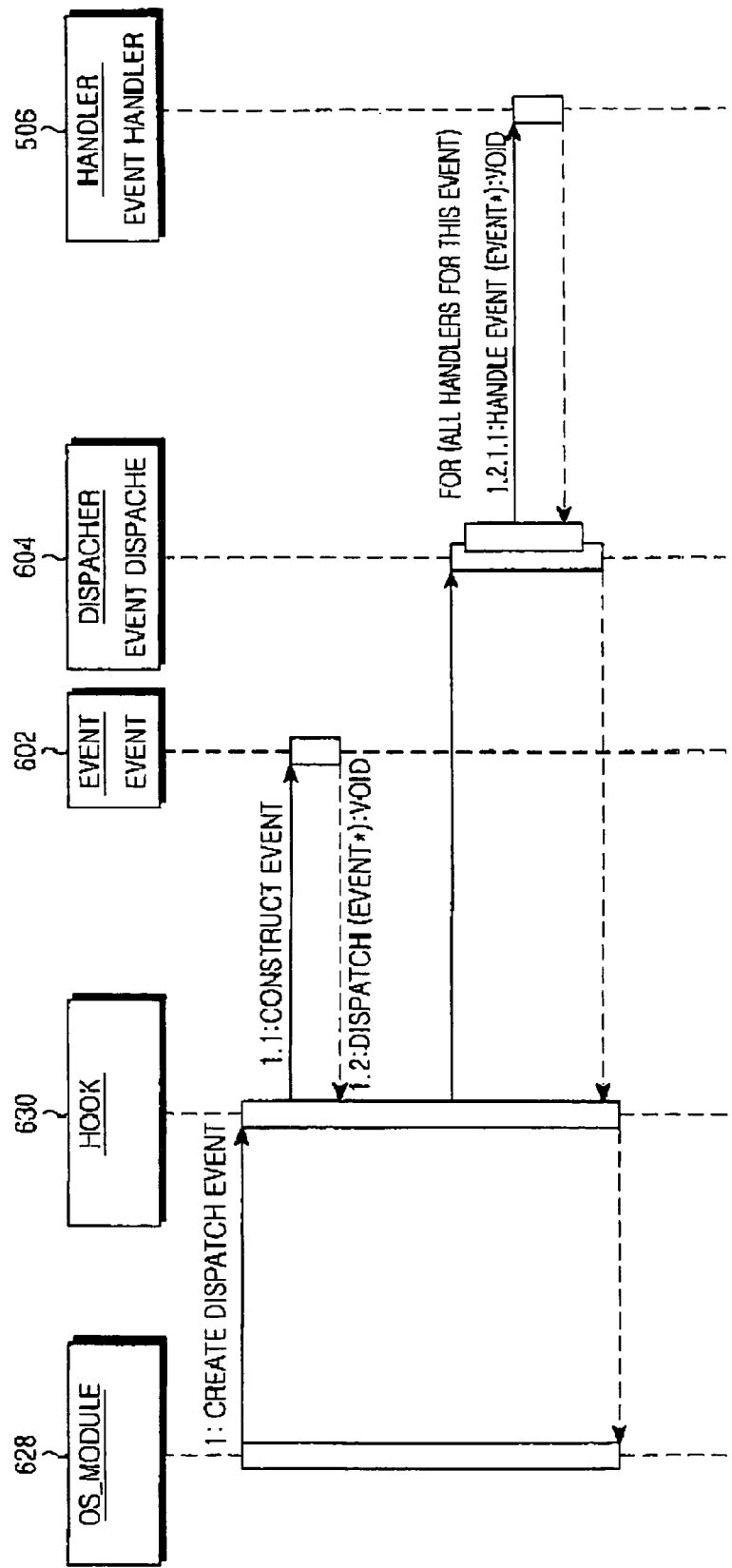

FIGS. 6A and 6B show an exemplary implementation of the infrastructure required for the adaptive system according to the present invention to perform one or more actions through the operating system of the mobile information device, as well as a sequence diagram for operation of the communication system 600. According to embodiments of the present invention, this infrastructure is an example of a more general concept of "AI wrappers", or the ability to "wrap" an existing UI (user interface) system with innovative AI and machine learning capabilities.

The communication system 600 is capable of handling various types of events, with a base class event 602 that communicates with the EventHandler 506 as previously described. The EventDispatcher 604 then routes the event to the correct object within the system of the present invention. Routing is determined by registration of the object with the EventDispatcher 604 for a particular event. The EventDispatcher 604 preferably manages a registry of handlers that implement the EventHandler 506 interface for such notification.

Specific events for which particular handlers are implemented include a flipper event handler 606 for cellular telephones in which the device can be activated or an incoming call answered by opening a "flipper"; when the flipper is opened or closed, this event occurs. Applications being operated according to the present invention may send events to each other, which are handled by an InterAppEvent handler 608. An event related to the evolution (change) of the creature or avatar is handled by an EvolutionEvent handler 610. An incoming or outgoing telephone call is handled by a CallEvent handler 612, which in turn has two further handlers, a CallStartedEvent handler 614 for starting a telephone call and a CallEndedEvent handler 616 for ending a telephone call.

An SMS event (incoming or outgoing message) is handled by an SMSEvent handler 618. Parameters which may be included in the event comprise parameters related to hybridization of the creature or avatar of one mobile information device with the creature or avatar of another mobile information device, as described in greater detail below.

Events related to operation of the keys are preferably handled by a KeyEvent handler 620 and/or a KeyCodeEvent handler 622. For example, if the user depresses a key on the mobile information device, the KeyEvent handler 620 preferably handles this event, which relates to incoming information for the operation of the system according to the present invention. In the sequence diagram, the key_event is an object from class KeyEvent, which represents the key event message object. The KeyEvent handler 620 handles the key_event itself, while the KeyCodeEvent handler 622 listens for input code (both input events are obtained through a hook into the operating system).

FIG. 6B is an exemplary sequence diagram, which shows how events are handled between the mobile information device operating system or other control structure and the system of the present invention. In this example, the mobile information device has an operating system, although a similar operation flow could be implemented for devices that lack such an operating system. If present, the operating system handles the input and output to/from the device, and manages the state and events which occur for the device. The sequence diagram in FIG. 6B is an abstraction for facilitating the handling of, and the relation to, these events.

An operating system module (os_module) 628 causes or relates to an event; a plurality of such modules may be present, but only one is shown for the purposes of clarity and without intending to be limiting in any way. The operating system module 628 is part of the operating system of the mobile information device. The operating system module 628 sends a notification of an event, whether received or created by operating system module 628, to a hook 630. The hook 630 is part of the system according to the present invention, and is used to permit communication between the operating system and the system according to the present invention. The hook 630 listens for relevant events from the operating system. The hook 630 is capable of interpreting the event from the operating system, and of constructing the event in a message which is comprehensible to the event 602. Hook 630 also dispatches the event to the EventDispatcher 604, which communicates with each handler for the event, shown as the EventHandler 506 (although there may be a plurality of such handlers). The EventDispatcher 604 then reports to the hook 630, which reports to the operating system module 628 about the handling of the event.

Figure 7A:
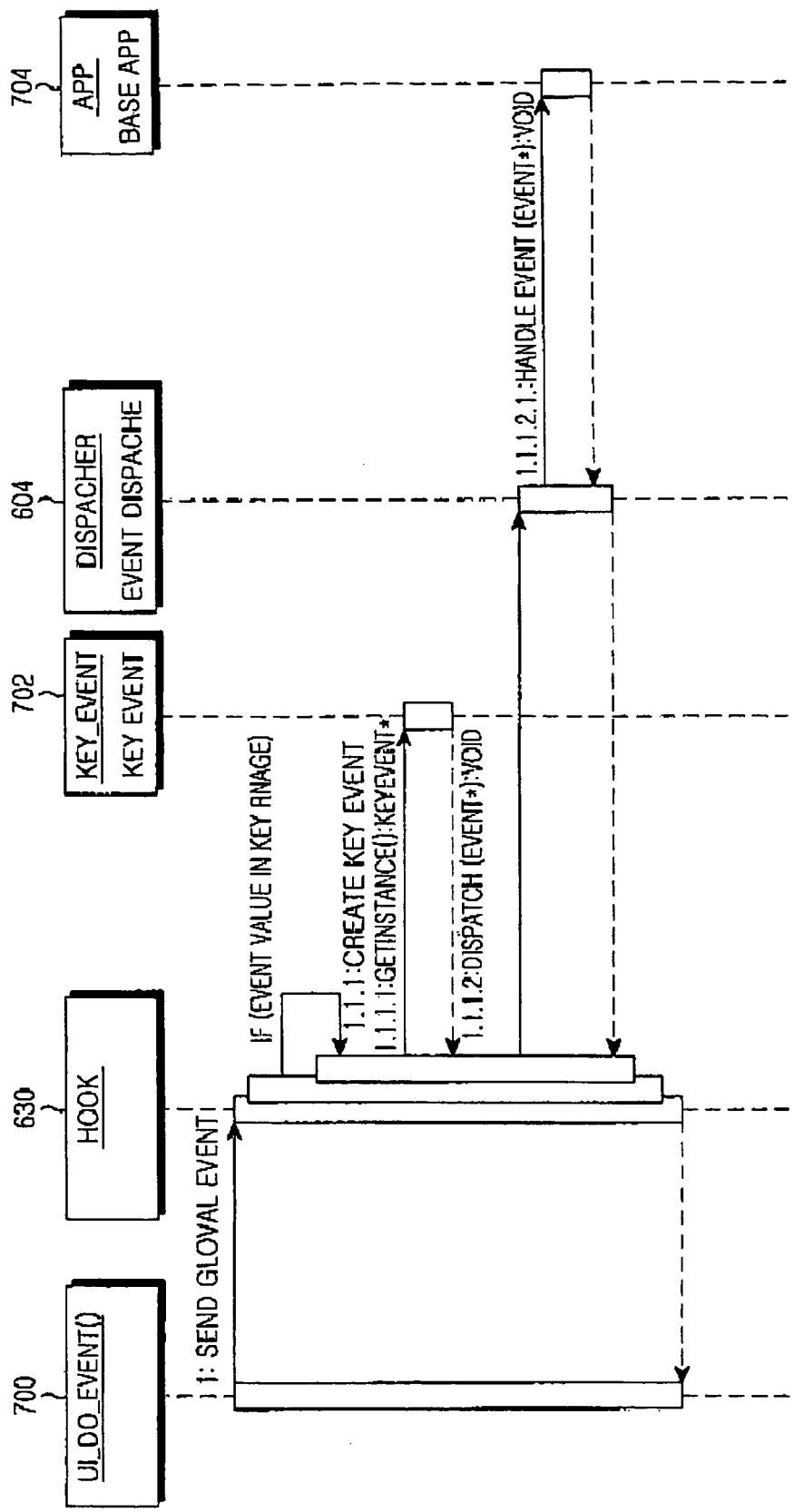
FIGS. 7A, 7B and 7C show exemplary events, and how they are handled by interactions between the mobile information device (through the operating system of the device) and the system of the present invention.
Figure 7B:
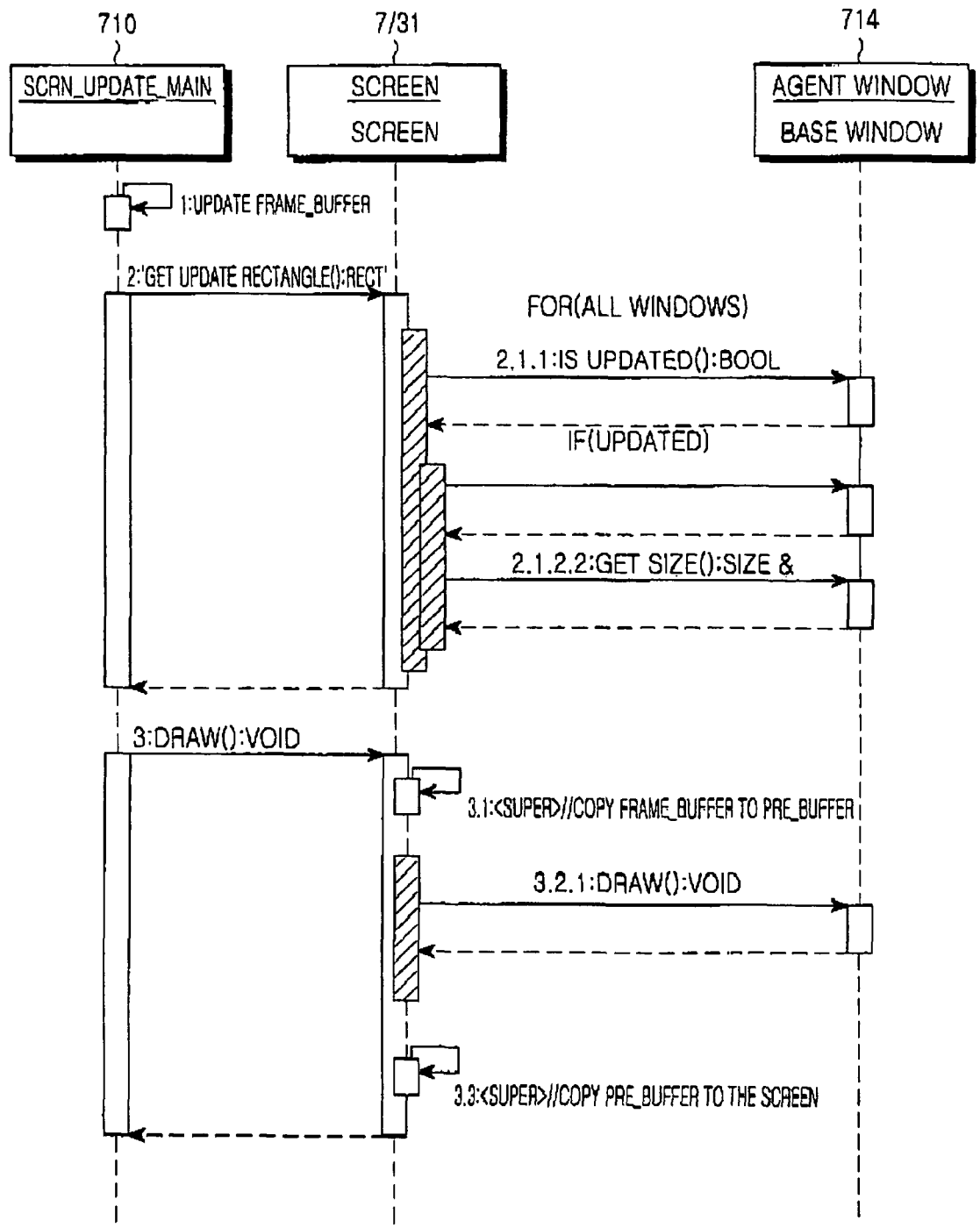
Figure 7C:
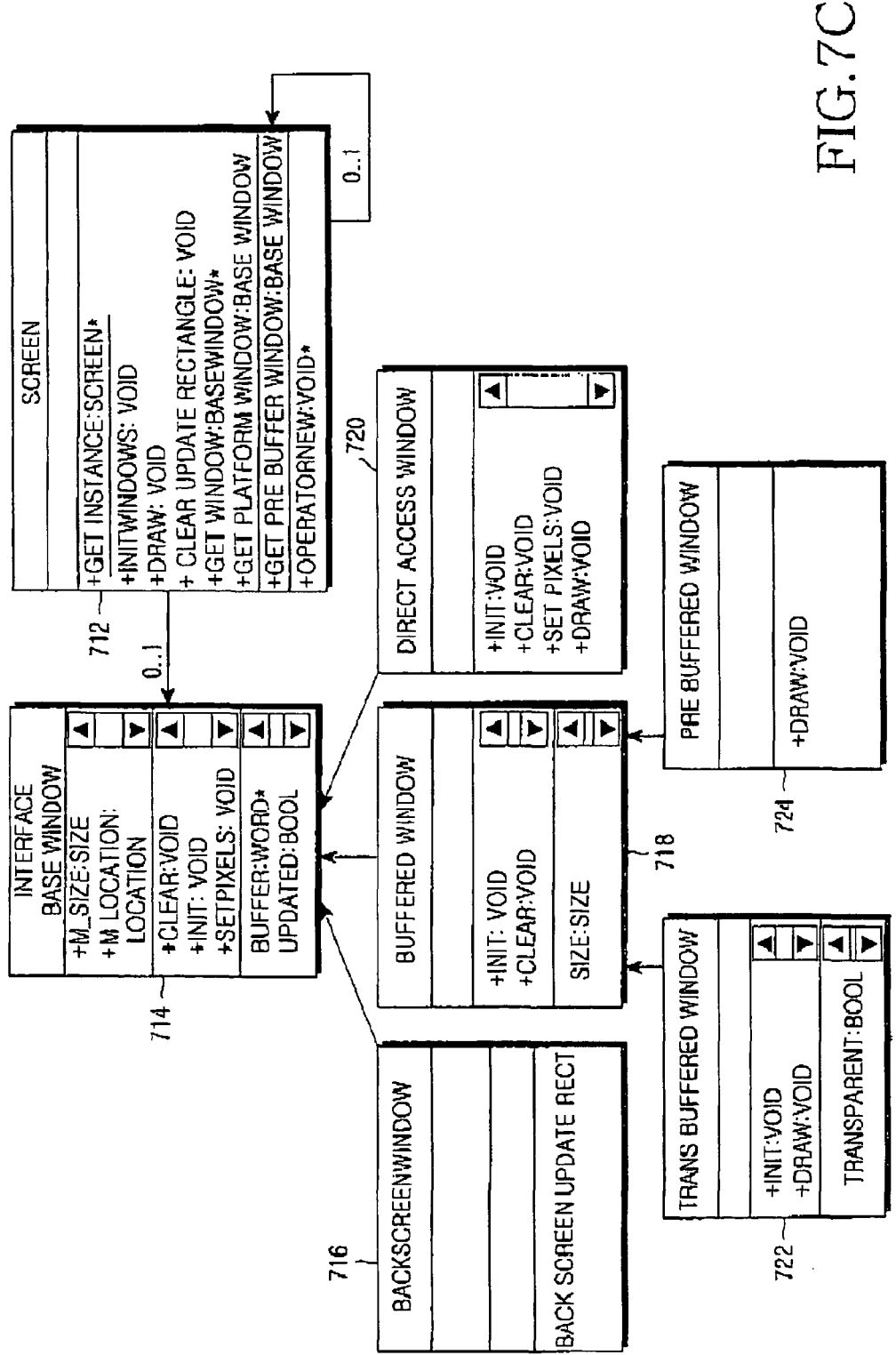

FIGS. 7A, 7B and 7C show exemplary events, and how they are handled by interactions between the mobile information device (through the operating system of the device) and the system of the present invention. It should be noted that some events may be handled within the system of the present invention, without reference to the mobile information device.

FIG. 7A shows an exemplary key event sequence diagram, described according to a mobile information device that has the DMSS operating system infrastructure from Qualcomm Inc., for their MSM (messaging state machine) CDMA (code division multiple access) mobile platform. This operating system provides operating system services such as user interface service, I/O services and interactive input by using the telephone keys (keypad). This example shows how an input event from a key is generated and handled by the system of the present invention. Other events are sent to the system in almost an identical manner, although the function of the hook 630 alters according to the operating system module which is sending the event; a plurality of such hooks is present, such that each hook has a different function with regard to interacting with the operating system.

As shown in FIG. 7A, a ui_do_event module 700 is a component of the operating system and is periodically invoked. When a key on the mobile device is pressed, the user interface (UI) structure which transfers information to the ui_do_event module 700 contains the value of the key. The hook 630 then receives the key value, identifies the event as a key event (particularly if the ui_do_event module 700 dispatches a global event) and generates a key event 702. The key event 702 is then dispatched to the EventDispatcher 604. The event is then sent to an application 704 which has requested to receive notification of such an event, preferably through an event handler (not shown) as previously described. Notification of success (or failure) in handling the event is then preferably returned to the EventDispatcher 604 and hence to the hook 630 and the ui_do_event module 700.

FIG. 7B shows a second illustrative example of a sequence diagram for handling an event; in this case, the event is passed from the system of the present invention to the operating system, and is related to drawing on the screen of the mobile information device. Information is passed through the screen access method of the operating system, in which the screen is (typically) represented by a frame buffer. The frame buffer is a memory segment that is copied by using the screen driver (driver for the screen hardware) and displayed by the screen. The system of the present invention produces the necessary information for controlling drawing on the screen to the operating system.

Turning now to FIG. 7B, as shown by arrow "1", the operating system (through scrn_update_main module 710) first updates the frame buffer for the screen. This updating may involve drawing the background for example, which may be displayed on every part of the screen to which data is not drawn from the information provided by the system of the present invention. The presence of such a background supports the use of semi-transparent windows, which may be used for the creature or agent as described in greater detail below.

The Scrn_update_main module 710 then sends a request for updated data to a screen module 712, which is part of the system of the present invention and which features a hook for communicating with the operating system. The screen module 712 then sends a request to each application window, shown as an agentWindow 714, of which a plurality may be present, for updated information about what should be drawn to the screen. If a change has occurred, such that an update is required, then the agentWindow 714 notifies the screen module 712 that the update is required. The screen module 712 then asks for the location and size of the changed portion, preferably in two separate requests (shown as arrows 2.1.2.1 and 2.1.2.2 respectively), for which answers are sent by the agentWindow 714.

The screen module 712 returns the information to the operating system through the scrn_update_main 710 in the form of an updated rectangle, as follows. The scrn_update_main 710 responds to the notification about the presence of an update by copying the frame buffer to a pre-buffer (process 3.1). The screen module 712 then draws the changes for each window into the pre-buffer, shown as arrow 3.2.1. The pre-buffer is then copied to the frame buffer and hence to the screen (arrow 3.3).

FIG. 7C shows the class architecture for the system of the present invention for drawing on the screen. The screen module 712 and the agentWindow 714 are both shown. The class agentWindow 714 also communicates with three other window classes, which provide information regarding updating (changes to) windows: BackScreenWindow 716, BufferedWindow 718 and DirectAccessWindow 720. The BufferedWindow 718 has two further window classes with which it communicates: TransBufferedWindow 722 and PreBufferedWindow 724.

Section 2: Action Selection System

This Section describes a preferred embodiment of an action selection system according to the present invention, including but not limited to a description of optional action selection according to incentive(s)/disincentive(s), and so forth. In order to assist in explaining how the actions of the intelligent agent are selected, an initial explanation is provided with regard to the structure of the intelligent agent, and the interactions of the intelligent agent with the virtual environment which is provided by the system of the present invention.

Figure 8A:
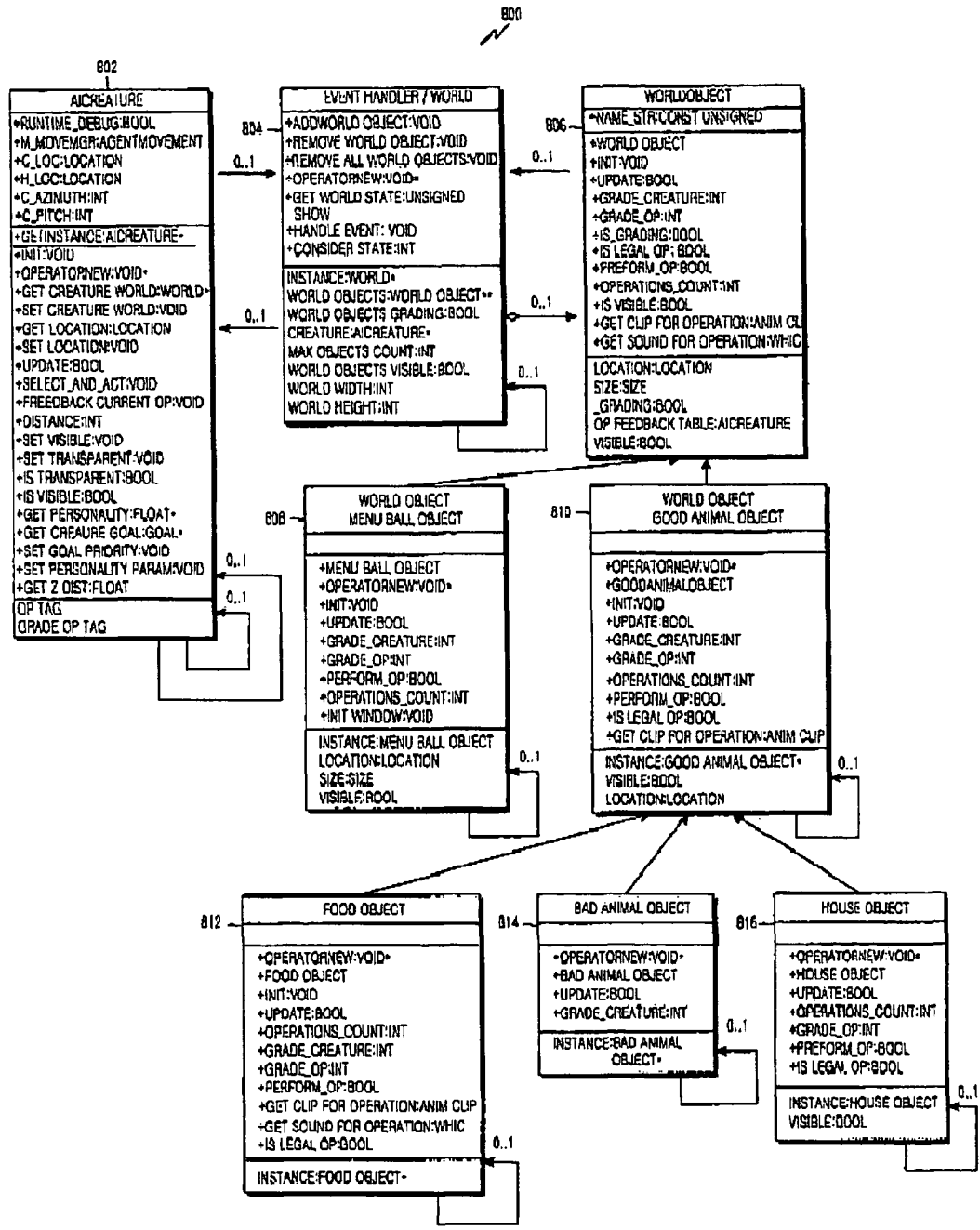
FIGS. 8A and 8B describe an exemplary structure of the intelligent agent and also includes an exemplary sequence diagram for the operation of the intelligent agent.
Figure 8B:
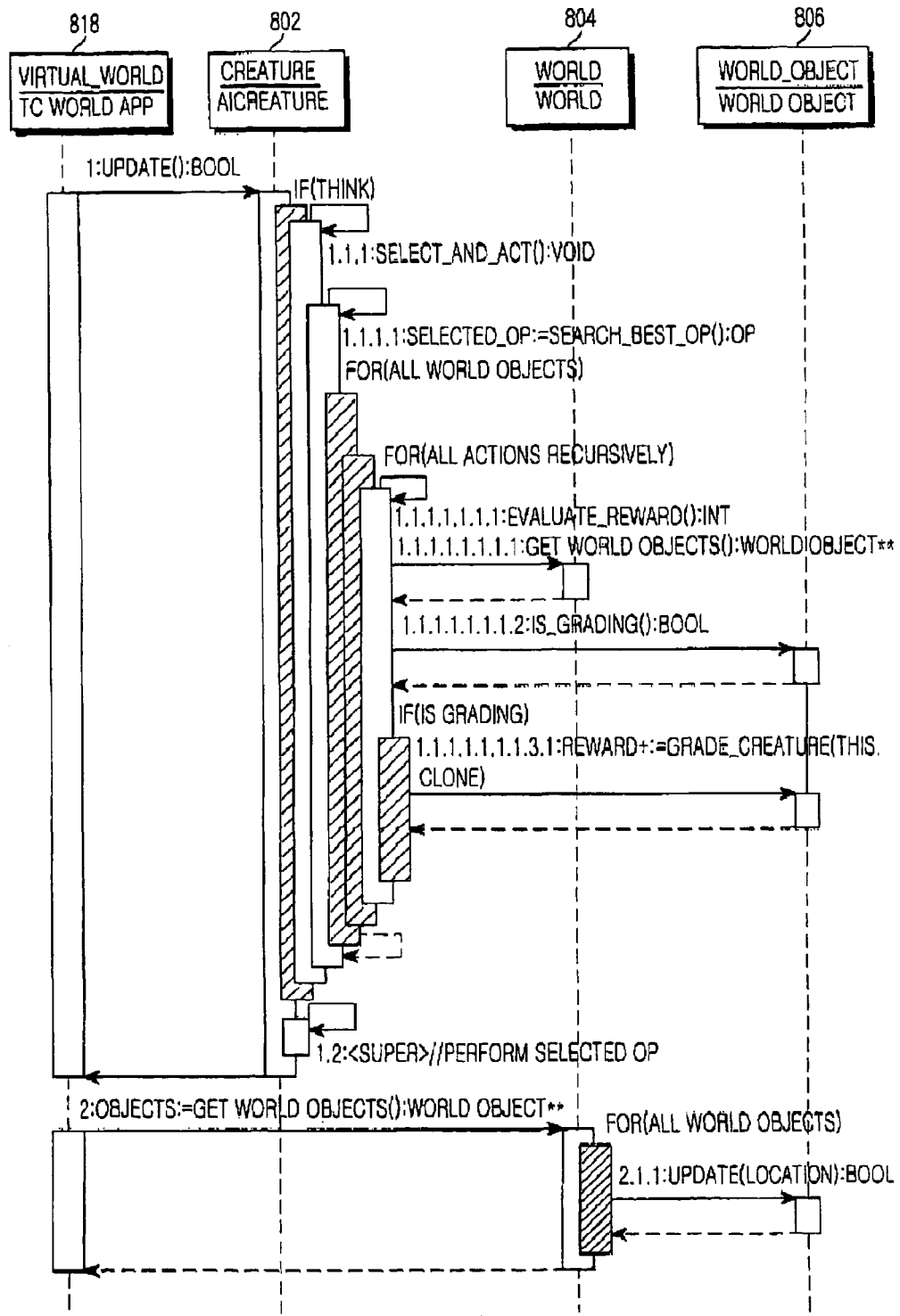

FIG. 8A describes an exemplary structure of the intelligent agent and FIG. 8B includes an exemplary sequence diagram for the operation of the intelligent agent. As shown with regard to FIG. 8A, an intelligent agent 800 includes a plurality of classes. The main class is an AICreature 802, which includes information about the intelligent agent such as its state, personality, goals etc, and also information about the appearance of the creature which visually represents the agent, such as location, color, whether it is currently visible and so forth.

The AICreature 802 communicates with World 804, which is the base class for the virtual environment for the intelligent agent. The World 804 in turn communicates with the classes which comprise the virtual environment, of which some non-limiting examples are shown. World 804 preferably communicates with various instances of a WorldObject 806, which represents an object that is found in the virtual environment and with which the intelligent agent may interact. The World 804 manages these different objects and also receives information about their characteristics, including their properties such as location and so forth. The World 804 also manages the properties of the virtual environment itself, such as size, visibility and so forth. The visual representation of the WorldObject 806 may use two dimensional or three dimensional graphics, or a mixture thereof, and may also use other capabilities of the mobile information device, such as sound production and so forth.

The WorldObject 806 itself may represent an object which belongs to one of several classes. This abstraction enables different object classes to be added to or removed from the virtual environment. For example, the object may be a "ball" which for example may start as part of a menu and then be "removed" by the creature in order to play with it, as represented by a MenuBallObject 808. A GoodAnimalObject 810 also communicates with the WorldObject 806; in turn, classes such as a FoodObject 812 (representing food for the creature), a BadAnimalObject 814 (an animal which may annoy the creature and cause them to fight for example) and a HouseObject 816 (a house for the creature) preferably communicate with the GoodAnimalObject 810. The GoodAnimalObject 810 includes the functionality to be able to draw objects on the screen and so forth, which is why other classes and objects preferably communicate with the GoodAnimalObject 810. Of course, many other classes and objects are possible in this system, since other toys may optionally be provided to the creature, for example.

The WorldObject 806 may also relate to the state of the intelligent agent, for example by providing a graded input to the state. This input is graded in the sense that it provides an incentive to the intelligent agent or a disincentive to the intelligent agent; it may also have a neutral influence. The aggregation of a plurality of such graded inputs enables the state of the intelligent agent to be determined. As described with regard to the sequence diagram of FIG. 8B, and also the graph search strategy and action selection strategy diagrams of FIGS. 9A and 9B respectively, the graded inputs are preferably aggregated in order to maximize the reward returned to the intelligent agent from the virtual environment.

These graded inputs may also include input from the user in the form of encouraging or discouraging feedback, so that the intelligent agent has an incentive or disincentive, respectively, to continue the behavior for which feedback has been provided. The calculation of the world state with respect to feedback from the user is performed as follows:

$$\text{Grade} = (\text{weighting\_factor} * \text{feedback\_reward}) + ((1 - \text{weighting\_factor}) * \text{world\_reward})$$

In which the feedback_reward results from the feedback provided by the user and the world_reward is the aggregated total reward from the virtual environment as described above; weighting_factor is a value between 0 and 1, which indicates the weight of the user feedback as opposed to the virtual environment (world) feedback.

Non-limiting examples of such reward for the agent's action include positive or negative feedback on the agent's suggestion; provision of a world object such as a ball or food to the agent; telephone usage duration; user teaching duration; and the like. Each of these examples can be assigned a predetermined score, and the agent's action can be restricted or expanded according to a corresponding accumulated score. For example, positive and negative feedback provided by the user may be assigned positive and negative point values, respectively; encountering an enemy or bad animal: −20 points; obtaining a food, toy or house object: +5 points; low battery alarm: −1 point; correct and incorrect answers, when the agent teaches the user: +1 point and −1 point, respectively; inactivity for 20 minutes: −1 point; wrong dialing: −1 point; SMS use: +1 point; and the like. The above examples may be applied in other ways.

FIG. 8B shows an illustrative sequence diagram for an exemplary set of interactions between the virtual world and the intelligent agent of the present invention. The sequence starts with a request from a virtual world module 818 to the AICreature 802 for an update on the status of the intelligent agent. A virtual world module 818 controls and manages the entire virtual environment, including the intelligent agent itself.

The intelligent agent then considers an action to perform, as shown by arrow 1.1.1. The action is preferably selected through a search (arrow 1.1.1.1) through all world objects, and then recursively through all actions for each object, by interacting with the World 804 and the WorldObject 806. The potential reward for each action is evaluated (arrow 1.1.1.1.1.1) and graded (arrow 1.1.1.1.1.2). The action with the highest reward is selected. The overall grade for the intelligent agent is then determined and the AICreature 802 performs the selected action.

The Virtual_world 818 then updates the location and status of all objects in the world, by communicating with the World 804 and the WorldObject 806.

Figure 9A:
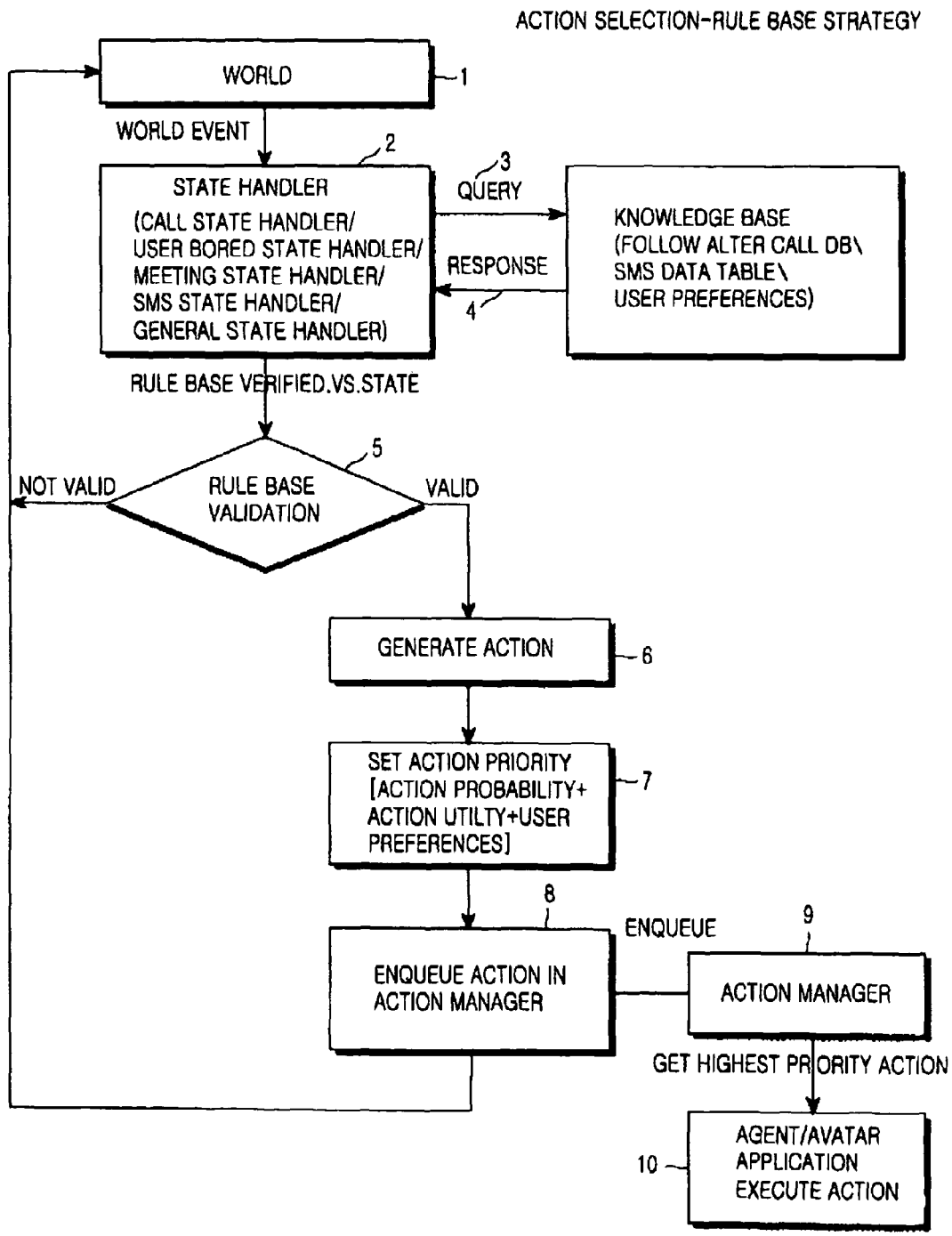
FIGS. 9A and 9B show two exemplary methods for selecting an action according to the present invention.
Figure 9B:
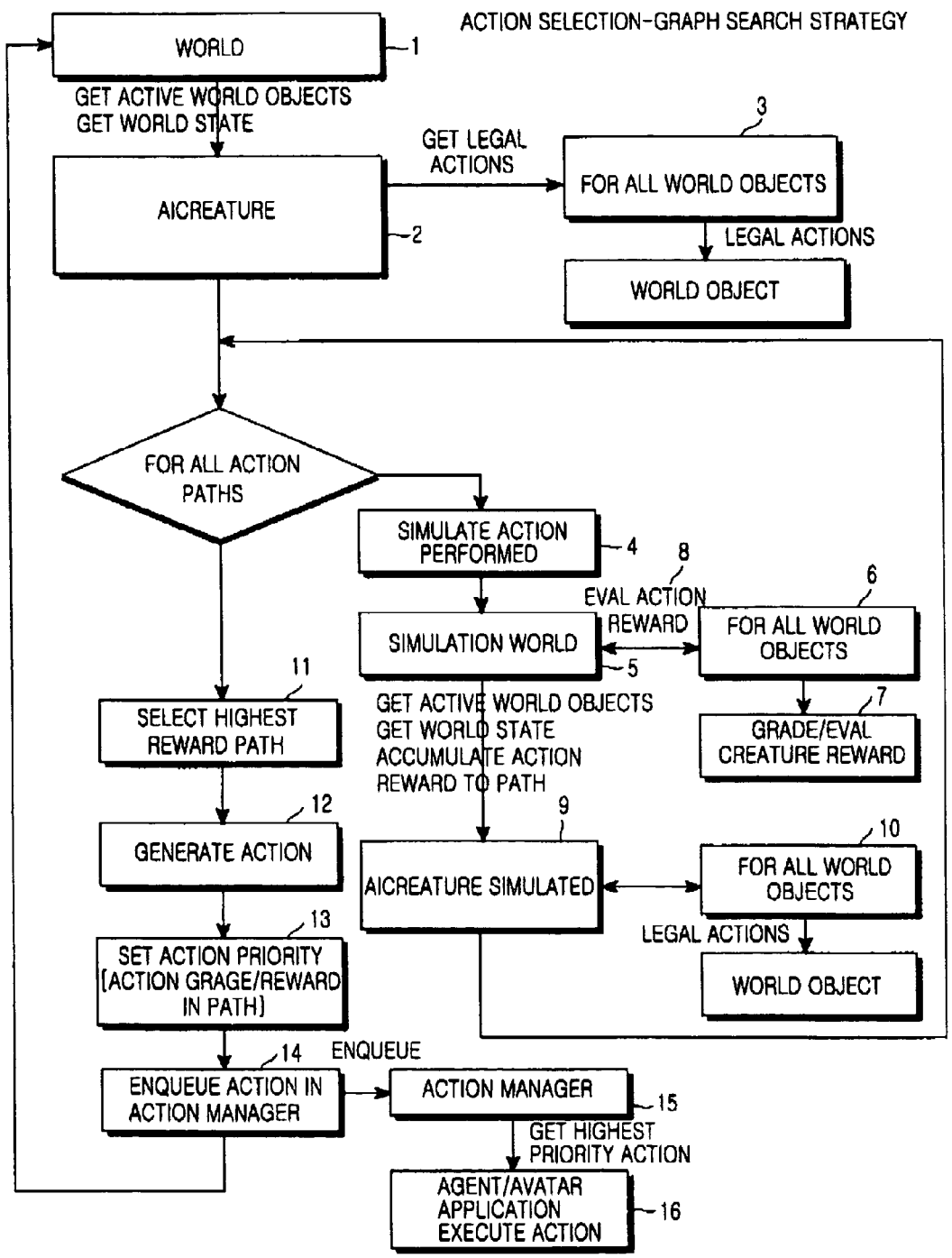

The search through various potential actions may optionally be performed according to one or more of a number of different methods. FIGS. 9A and 9B show two exemplary methods for selecting an action according to the present invention.

FIG. 9A shows an exemplary method for action selection, termed herein a rule based strategy for selecting an action. In stage 1, the status of the virtual environment is determined by the World state. A World Event occurs, after which the State Handler which is appropriate for that event is invoked in stage 2. The State Handler preferably queries a knowledge base in stage 3. The knowledge base may be divided into separate sections and/or separate knowledge bases according to the State Handler which has been invoked. In stage 4, a response is returned to the State Handler.

In stage 5, rule base validation is performed, in which the response (and hence the suggested action which in turn brings the intelligent agent into a specific state) is compared against the rules. If the action is not valid, then the process returns to stage 1. If the action is valid, then in stage 6 the action is generated. The priority for the action is then determined in stage 7; more preferably, the priority is determined according to a plurality of inputs, including but not limited to, an action probability, an action utility and a user preference. In stage 8, the action is placed in a queue for the action manager. In stage 9, the action manager retrieves the highest priority action, which is then performed by the intelligent agent in stage 10.

FIG. 9B shows an exemplary action selection method according to a graph search strategy. Again, in stage 1 the process begins by determining the state of the world (virtual environment), including the state of the intelligent agent and of the objects in the world. In stage 2, the intelligent agent is queried. In stage 3, the intelligent agent obtains a set of legal (permitted or possible) actions for each world object; preferably each world object is queried as shown.

The method now branches into two parts. A first part, shown on the right, is performed for each action path. In stage 4, an action to be performed is simulated. In stage 5, the effect of the simulation is determined for the world, and is preferably determined for each world object in stage 6. In stage 7, a grade is determined for the effect of each action.

In stage 8, the state of the objects and hence of the world is determined, as is the overall accumulated reward of an action. In stage 9, the effect of the action is simulated on the intelligent agent; preferably the effect between the intelligent agent and each world object is also considered in stage 10.

Turning now to the left branch of the method, in stage 11, all of this information is preferably used to determine the action path with the highest reward. In stage 12, the action is generated. In stage 13, the action priority is set, preferably according to the action grade or reward. In stage 14, the action is placed in a queue at the action manager, as in FIG. 9A. In stage 15, the action is considered by the action manager according to priority; the highest priority action is selected, and is executed in stage 16.

Figure 10:
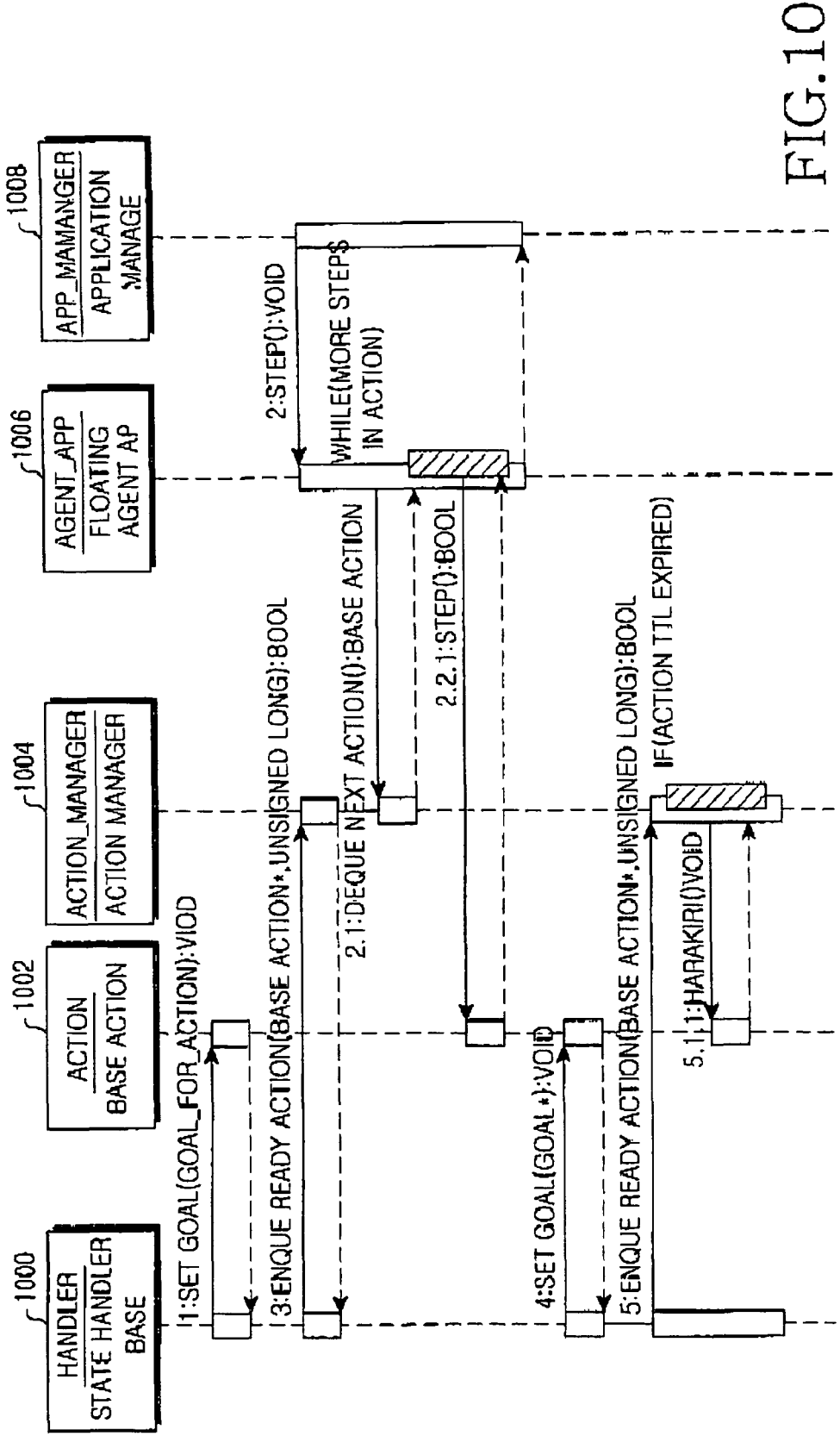
FIG. 10 shows a sequence diagram of an exemplary action execution method according to the present invention.

Next, a description is provided of an exemplary action execution method and structure. FIG. 10 shows a sequence diagram of an exemplary action execution method according to the present invention. A handler 1000 send a goal for an action to an action module 1002 in arrow 1, which features a base action interface. The base action interface enables the action module 1002 to communicate with the handler 1000 and also with other objects in the system, which are able to generate and post actions for later execution by the intelligent agent, shown here as a FloatingAgentApp 1006. These actions are managed by an action manager 1004.

The action manager 1004 has two queues containing action objects. One queue is the ready for execution queue, while the other queue is the pending for execution queue. The latter queue may be used for example if an action has been generated, but the internal state of the action is pending so that the action is not ready for execution. When the action state matures to be ready for execution, the action is preferably moved to the ready for execution queue.

An application manager 1008 interacts with the FloatingAgentApp 1006 for executing an action, as shown in arrow 2. The FloatingAgentApp 1006 then requests the next action from the action manager 1004 (arrow 2.1); the action itself is provided by the action module 1002 (arrow 2.2.1). Actions are enqueued from the handler 1000 to the action manager 1004 (arrow 3). Goals (and hence at least a part of the priority) are set for each action by communication between the handler 1000 and the action module 1002 (arrow 4). Arrows 5 and 6 show the harakiri ( ) method, described in greater detail below.

As previously described, the actions are queued in priority order. The priority is determined through querying the interface of the action module 1002 by the action manager 1004. The priority of the action is determined according to a calculation which includes a plurality of parameters. For example, the parameters may include the priority as derived or inferred by the generating object, more preferably based upon the predicted probability for the success of the action; the persistent priority for this type of action, which is determined according to past experience with this type of action (for example according to user acceptance and action success); and the goal priority, which is determined according to the user preferences.

One optional calculation for managing the above parameters is as follows:

$$P(\text{all})=P(\text{action probability})*((P(\text{persistent priority})+P(\text{action goal})/10))/2)$$

Complementary for the priority based action execution, each action referably has a Time To Live (ttl) period; this ttl value stands for the amount of execution time passed between the time when the action was posted in the ready queue and the expiration time of this action. If an action is ready but does not receive a priority for execution until its ttl has expired, the action manager 1004 preferably invokes the method harakiri( ), which notifies the action that it will not be executed. Each such invocation of harakiri( ) preferably decreases the priority of the action until a threshold is reached. After this threshold has been reached, the persistent priority starts to increase. This model operates to handle actions that were proposed or executed but failed since the user aborted the action. The persistent priority decreases by incorporating the past experience in the action priority calculation.

This method shows how actions that were suggested or executed adapt to the specific user's implicit preferences in realtime.

This model is not complete without the harakiri( ) mechanism since if an action persistent priority reduces, so the action does not run, it needs to be allowed to either be removed or else possibly run again, for example if the user preferences change. After several executions of harakiri( ), the action may regain the priority to run.

The previous Sections provide infrastructure, which enables various actions and mechanisms to be performed through the adaptive system of the present invention. These actions and mechanisms are described in greater detail below.

EXAMPLE 3

Evolution System for an Intelligent Agent

This example describes a preferred embodiment of an evolution system according to the present invention, including but not limited to a description of DNA (DeoxyriboNucleic Acid) for the creature or avatar according to a preferred embodiment of the present invention, and also a description of an optional gene studio according to the present invention. The evolution system enables the creature or avatar to "evolve", that is, to alter at least one aspect of the behavior and/or appearance of the creature. This example is described as being operative with the intelligent agent described in example 2, but this description is for the purposes of illustration only and is not meant to be limiting in any way. In other words, the evolution system for the intelligent agent described in this example may be used (but not necessarily) in conjunction with the learning module and the action selection system described above, thereby making it possible to implement a system that can determine the user's preferences and actively evolve without requesting the user's behavior.

Evolution (change) of the intelligent agent is described herein with regard to both tangible features of the agent, which are displayed by the avatar or creature, and non-tangible features of the agent, which affect the behavior of the avatar or creature.

Figure 11A:
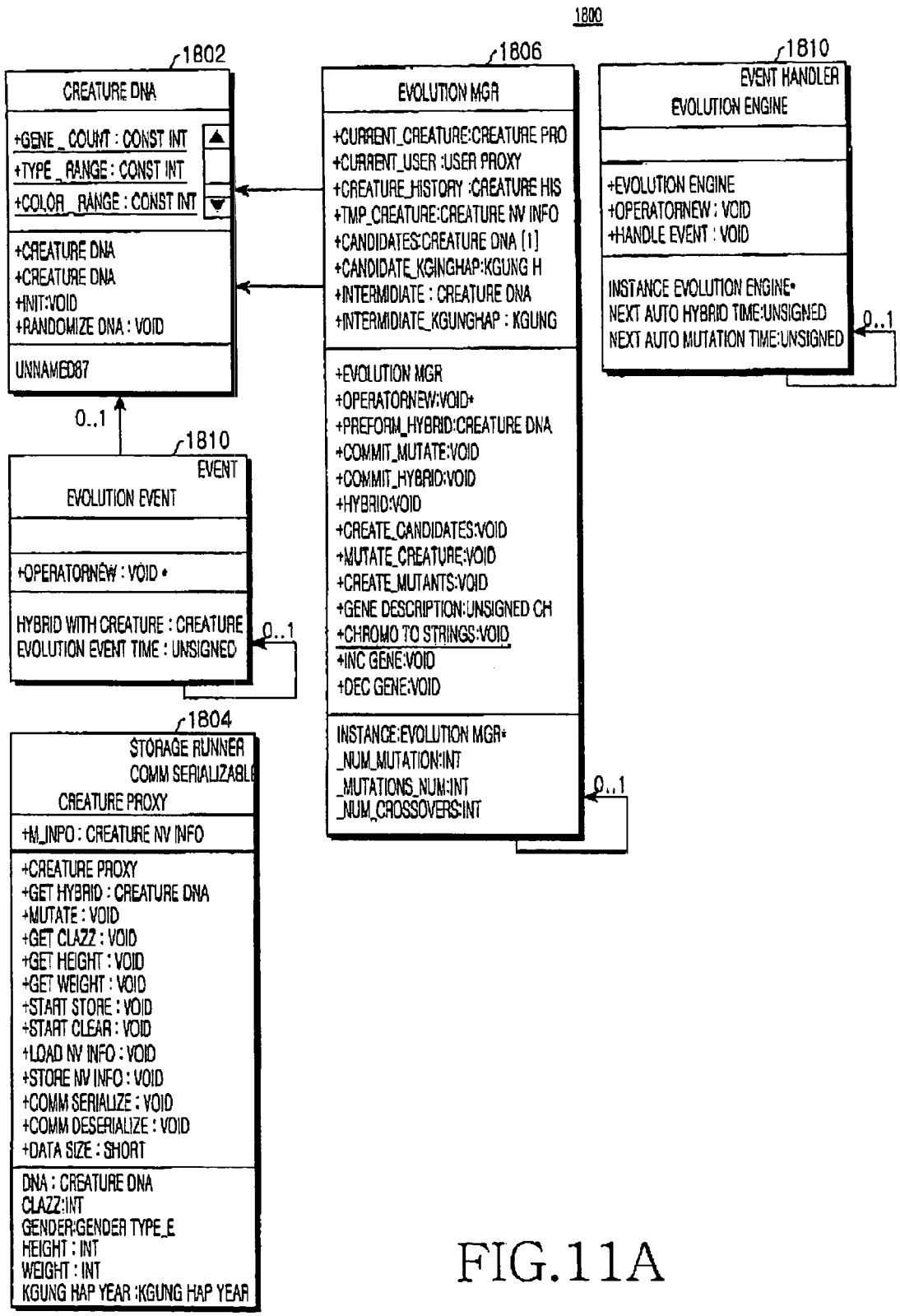
FIGS. 11A, 11B and 11C show an exemplary evolution class diagram, and an exemplary mutation and an exemplary hybrid sequence diagram, respectively, according to the present invention.

FIG. 11A shows an exemplary evolution class diagram 1800. The genetic model described in the class diagram allows for various properties of the intelligent agent to be changed, including visual as well as functional properties. The model includes a CreatureDNA class 1802 that represents the DNA structure. The DNA structure is a vector of available genes and can preferably be extended to incorporate new genes. A gene is a parameter with a range of possible values (i.e. genotype). The gene is interpreted by the system according to the present invention, such that the expression of the data in the gene is its genotype. For example the head gene is located as the first gene in the DNA, and its value is expressed as the visual structure of the creature's head, although preferably the color of the head is encoded in another gene.

In order to evolve the intelligent agent to achieve a specific DNA instance that pleases the user, the genetic model according to the present invention implements hybrid and mutate genetic operations that modify the DNA. The CreatureProxy class 1804 is responsible for providing an interface to the DNA and to the genetic operations for the system classes. CreatureProxy 1804 holds other non-genetic information about the intelligent agent (i.e. name, birth date, and so forth).

The EvolutionMGR class 1806 manages the evolutions of the intelligent agent and provides an interface to the CreatureProxy 1804 of the intelligent agent and its genetic operations to applications.

The EvolutionEngine class 1808 listens to evolution events that may be generated from time to time, for indicating that a certain genetic operation should be invoked and performed on the intelligent agent DNA. The DNA structure is given below.

The CreatureDNA 1802 preferably listens to such evolution events from the EvolutionEvent 1810. The following is an algorithm defining an examplory DNA structure.

DNA Structure

```
#ifndef __CREATURE_DNA__
#define __CREATURE_DNA__
#include "CreatureDefs.h"
#include "CommSerializable.h"
#define GENE_COUNT 19
#define BASE_COLOR_GENE 8
typedef struct internal_dna
{
    unsigned char gender;
    unsigned char head;
    unsigned char head_color;
    unsigned char head_scale;
    unsigned char body;
    unsigned char body_color;
    unsigned char body_scale;
    unsigned char hand;
    unsigned char hand_color;
    unsigned char hand_scale;
    unsigned char tail;
    unsigned char tail_color;
    unsigned char tail_scale;
    unsigned char leg;
    unsigned char leg_color;
    unsigned char leg_scale;
    unsigned char dexterity;
    unsigned char efficiancy;
    unsigned char interactive;
    unsigned char base_color;
} internal_dna;
typedef internal_dna p_internalDna;
/**
 * This class represents the Creature DNA structure.
 * The DNA holds all the data about the Creature body parts and some
 * personality and functional qualities
 */
class CreatureDNA /*: public CommSerializable*/
{
public:
    static const int gene_count;
    /**
     * defualt constructor, DNA is initialized to zero
     */
    CreatureDNA( );
    /*
     * Copy constructor
     * @param other - the DNA to copy
     */
    CreatureDNA(const CreatureDNA &other);
    /**
     * Initialization function, should be called if the
constructor was not
     * called.
     */
    void init( );
    /**
     * Randomizes the DNA data
     *
     */
    void randomizeDna( );
    /**
     * The DNA actual data
     */
    union {
        internal_dna genes;
```

-continued

```
        unsigned char data[GENE_COUNT];
};
/**
 * Range of gender gene
 */
static const int GENDER_RANGE;
/**
 * Range of type gene
 */
static const int TYPE_RANGE;
/**
 * Range of color gene
 */
static const int COLOR_RANGE;
/**
 * Range of scale gene
 */
static const int SCALE_RANGE;
/**
 * Range of character genes
 */
static const int CHARECTER_RANGE;
static const int BASE_COLOR_RANGE;
private:
    /**
     * Location of scale gene in the type,color,scale
triplet
     */
    static const int SCALE_LOCATION;
};
#endif /*___CREATURE_DNA___*/
```

Intelligent agent DNA construction is preferably performed as follows. When providing a version of a "living" mobile phone, the DNA is preferably composed from a Gene for each Building Block of the intelligent agent. The building block can be a visual part of the agent, preferably including color or scale (size of the building block), and also can include a non visual property that relate to the functionality and behavior of the intelligent agent. This model of DNA composition can be extended as more building blocks can be added and the expression levels of each building block can increase.

The construction of an intelligent agent from the DNA structure is performed with respect to each gene and its value. Each gene (building block) value (expression level) describes a different genotype expressed in the composed agent. The basic building blocks of the visual agent are modeled as prototypes, hence the amount of prototypes dictate the range of each visual gene. It is also possible to generate in runtime values of expressed genes not relaying on prototypes, for example color gene expression levels can be computed as indexes in the host platform color table, or scale also can be computed with respect to the host screen size, to obtain genotypes that are independent of predefined prototypes. The prototype models are decomposed and then a non-prototype agent is recomposed according to the gene values of each building block.

The following example provides an illustrative non-limiting explanation of this process. For simplicity and clarity, color and scale, and other non visual genes, are not included, but the same process also applies to these genes.

Without taking into consideration the gender gene, a 16 prototype and 5 building block version of DNA may optionally be given as follows:

$DNA_0$={[head,0:15], [body,0:15], [legs, 0:15], [hands, 0:15], [tail, 0:15]}

Each of the 5 building blocks has 16 different possible genotypes according to the building block gene values that are derived from the number of prototype models. When composing the intelligent agent, the right building block is taken according to the value of that building block in the DNA, which is the value of its respective gene.

For example a specific instance of the DNA scheme described above can be:

DNA={[3],[5],[10],[13],[0]}

The variety of possible intelligent agent compositions in this simple DNA version is:

$V_0 = (16)*(16)*(16)*(16)*(16) = (16)^5 = 1048576$

If a base color gene for describing the general color of the intelligent agent (i.e. green, blue, and so forth) is added, with expression level of possible 16 base colors, the following variety is obtained:

$DNA_1$={[head,0:15], [body,0:15], [legs, 0:15], [hands, 0:15], [tail, 0:15], [bs_color,0:15]}

The variety then becomes:

$V_1 = V_0 * 16 = (16)^6 = 16777216$

If an intensity gene for the base color gene (i.e from light color to dark color) is added to this DNA version, with an expression level of possible 16 intensities of the base color, the following variety is preferably obtained:

$DNA_2$={[head,0:15], [body,0:15], [legs, 0:15], [hands, 0:15], [tail, 0:15], [bs_color,0:15], [intensity,0:15]}

The variety calculation is:

$V_2 = V_1 * 16 = (16)^7 = 268435456$

The present invention can express a variety of agent combination types as described above without storing the information of each of the completed combination types. According to the present invention, only with both the information of building blocks of the combination types and the information of a method for combining the building blocks is it possible to make a variety of agent combination types as described above. Accordingly, in case the agent is used with a portable computational device, it is possible for each of the computational device users to hold a substantially-unique type of agent, thanks to diversity in the combination methods.

On the other hand, according to another embodiment, 16 prototype and 5 building block version of the above DNA may optionally be given as follows:

$DNA_0$={[head$_1$,0:15], [body$_0$,0:15], [legs$_0$,0:15], [hands$_0$,0:15], [tail$_0$,0:15]}, when 0<Tg<Tth, and $DNA_1$={[head$_1$,0:15], [body$_0$,0:15], [legs$_1$,0:15], [hands$_1$,0:15], [tail$_1$,0:15]}, when Tg≥Tth, (where "Tg" denotes a growth time of the agent and "Tth" denotes a threshold time).

In this example, the threshold time Tth is set to 2 weeks, but may also be set differently. The growth time Tg of the agent indicates a time period from when the computational device user resets the agent or starts using the agent for the first time, to the current time. In this case, a trait expressed by the $DNA_0$ may be selected from a combination of first building blocks if the growth time of the agent is less than 2 weeks, whereas a trait expressed by the $DNA_1$ may be selected from a combination of second building blocks if the growth time is 2 weeks or more. If the first building-block combination is set to represent the appearance of a younger agent, and the second building-block combination is set to represent the appearance of a more grown-up agent, it is possible to implement the appearance of an agent with the same genes that automatically grows as time goes on. After the user starts using the agent for the first time, the growth of the agent occurs only with the lapse of time. In case two threshold times are set, the growth of the agent is composed of three steps. It is also possible to set more than two threshold times.

Figure 11B:
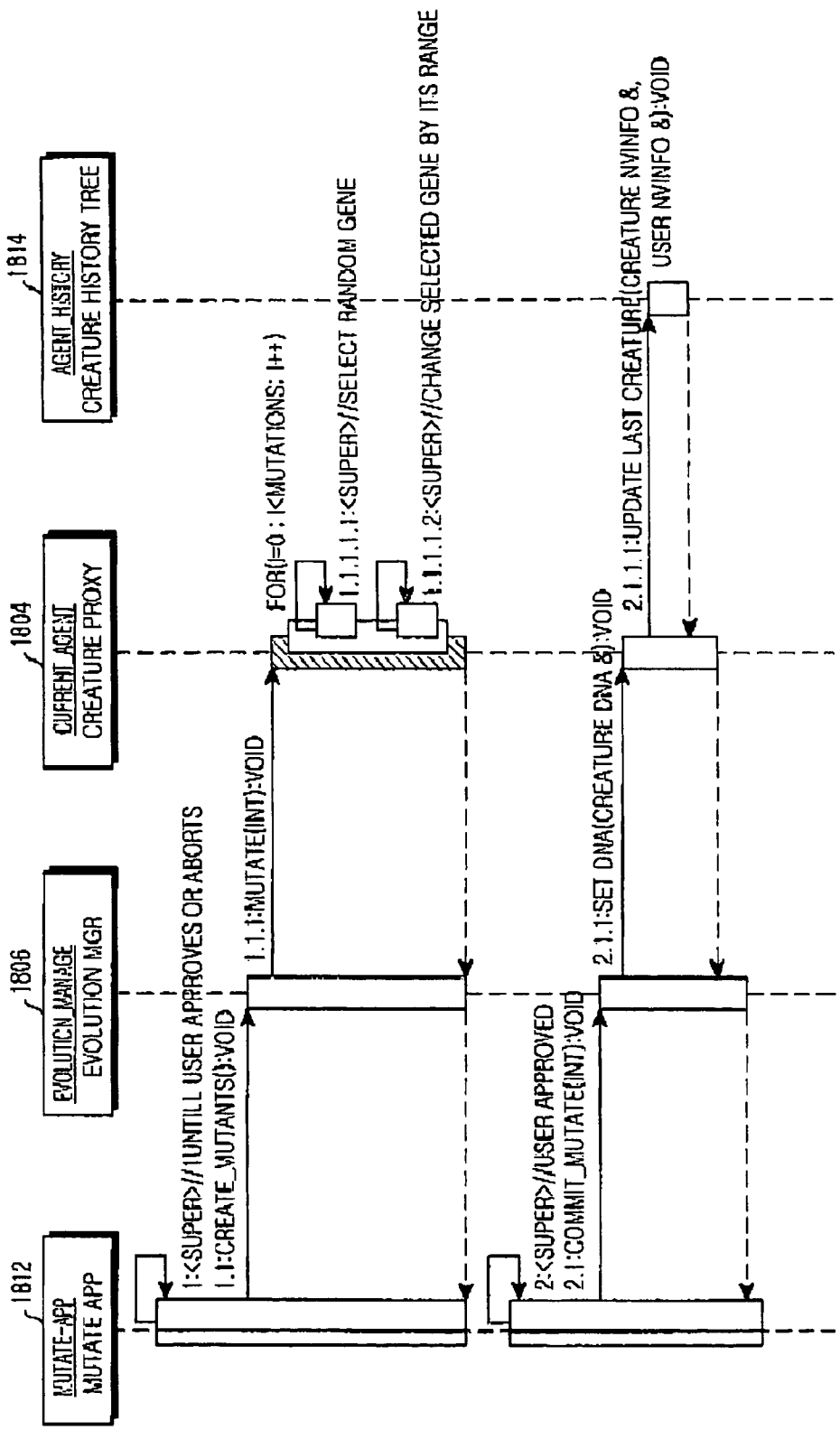
Figure 11C:
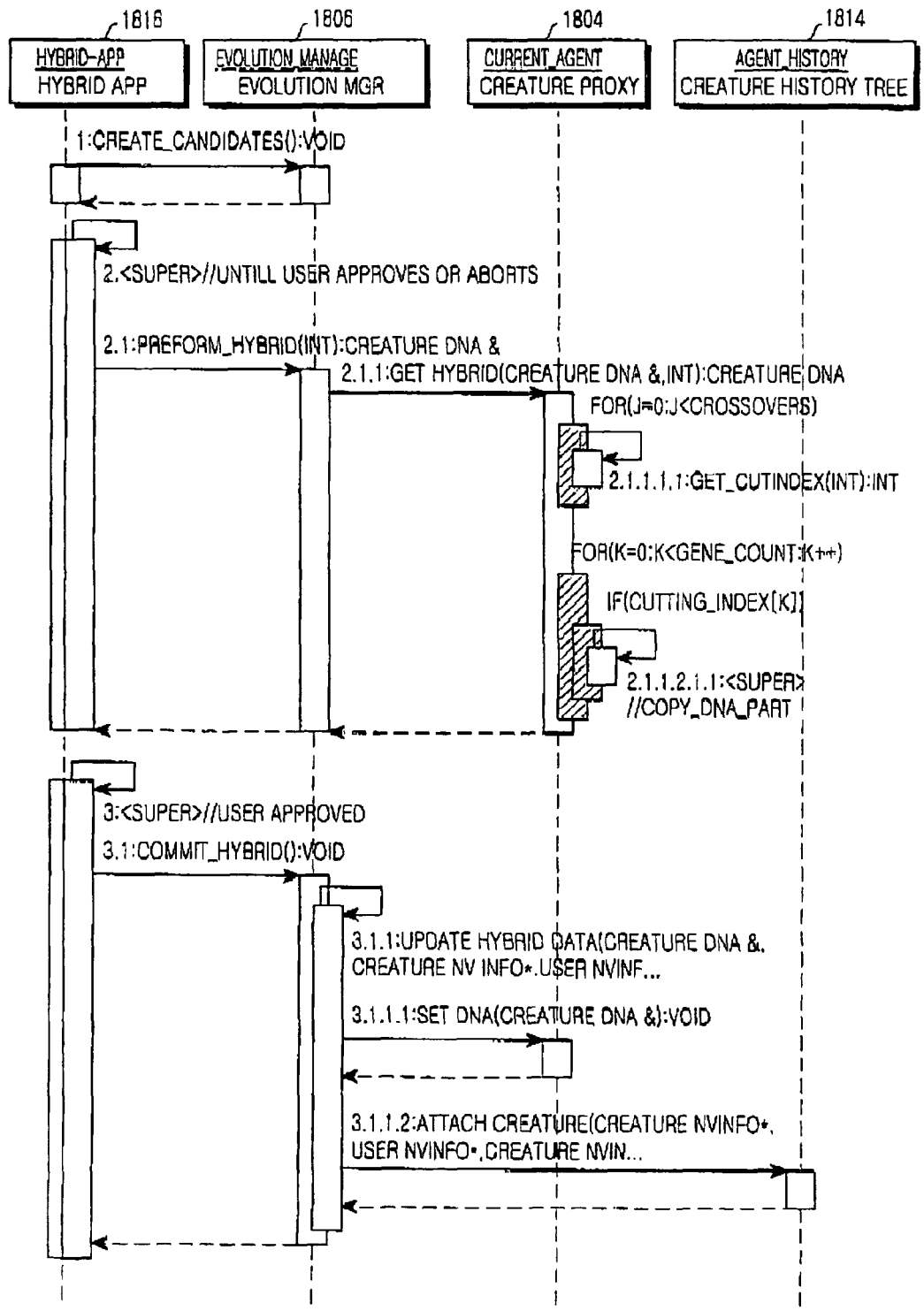

A variety of genetic operations may be performed on the DNA, as described with regard to FIGS. 1B and 11C, which show a mutation sequence diagram and a hybridization sequence diagram, respectively.

As shown in FIG. 11B, the basic mutation operation randomly selects a gene from the gene set that can be mutated, which may be the entire DNA, and then change the value of the selected gene within that gene's possible range (expression levels). The basic operation can be performed numerous times.

A mutate application 1812 sends a request to the EvolutionMGR 1806 (arrow 1.1) to create a mutant. The EvolutionMGR class 1806 passes this request to the CreatureProxy 1804, for a number of mutants (this value may be given in the function call; arrow 1.1.1). For each such mutant, the CreatureProxy 1804 preferably selects a random gene (arrow 1.1.1.1.1) and changes it to a value that is still within the gene's range (arrow 1.1.1.1.2). The mutant(s) are then returned to the mutate application 1812, and are preferably displayed to the user, as described in greater detail below with regard to Example 4.

If the user approves of a mutant, then the mutate application 1812 sends a command to replace the existing implementation of the agent with the new mutant (arrow 2.1) to the EvolutionMGR 1806. The EvolutionMGR 1806 then sets the DNA for the creature at the CreatureProxy 1804 (arrow 2.1.1), which preferably then updates the history of the agent at the agent_history 1814 (arrow 2.1.1.1).

FIG. 11C shows an exemplary sequence diagram for the basic hybrid operation (or cross-over operation), which occurs when two candidate DNAs are aligned one to the other. Both the two candidate DNAs may be obtained from the intelligent agent system. One of the two candidate DNAs may also be obtained from an intelligent agent system for another mobile information device. For example, in the case of an intelligent agent for a networked mobile information device in Example 5 described below, one of the two candidate DNAs may be obtained from an intelligent agent for a second mobile information device of a second user via a short message service (SMS).

Taking into consideration the gender gene, the above DNA may be represented as follows:

$DNA_0=\{[gender, 0:1], [head, 0:15], [body, 0:15], [legs, 0:15], [hands, 0:15], [tail, 0:15]\}$ The gender gene determines whether the hybrid operation is allowed. Preferably, the hybrid operation is allowed only between different gender genes. However, if the gender gene is not taken into consideration, the hybrid operation may be allowed in any case. For the hybrid operation, one or more cross over points located on the DNA vector are preferably selected (the cross-over points number can vary from 1 to the number of genes in the DNA; this number may be randomly selected). The operation of selecting the crossover points is called get_cut_index. At each cross over point, the value for the DNA is selected from one of the existing DNA values. This may be performed randomly or according to a count called a cutting_index. The gender-gene hybrid operation is performed by selecting one of the corresponding two genes. The result is a mix between the two candidate DNAs. The basic hybrid operation can be performed numerous times with numerous candidates.

As shown, a HybridApp 1816 sends a command to the EvolutionMGR 1806 to begin the process of hybridization. The process is optionally performed until the user approves of the hybrid agent or aborts the process. The EvolutionMGR 1806 starts hybridization by sending a command to obtain target DNA (arrow 2.1.1) from the CreatureProxy 1804, with a number of cross-overs (hybridizations) to be performed. As shown, a cutting_index is maintained to indicate when to do a cross-over between the values of the two DNAs.

The hybrid agent is returned, and if the user approves, then the current agent is replaced with the hybrid agent, as described above with regard to the mutant process. In the end, the history of the agent at the agent_history 1814 is updated.

Hybridization may be performed with agent DNA that is sent from a source external to the mobile information device, for example in a SMS message, through infrared, BlueTooth or the Internet, or any other source. For the purpose of description only and without any intention of being limiting, this process is illustrated with regard to receiving such hybrid DNA through an SMS message. The SMS message preferably contains the data for the DNA in a MIME type. More, the system of the present invention has a hook for this MIME type, so that this type of SMS message is automatically parsed for hybridization without requiring manual intervention by the user.

Figure 12:
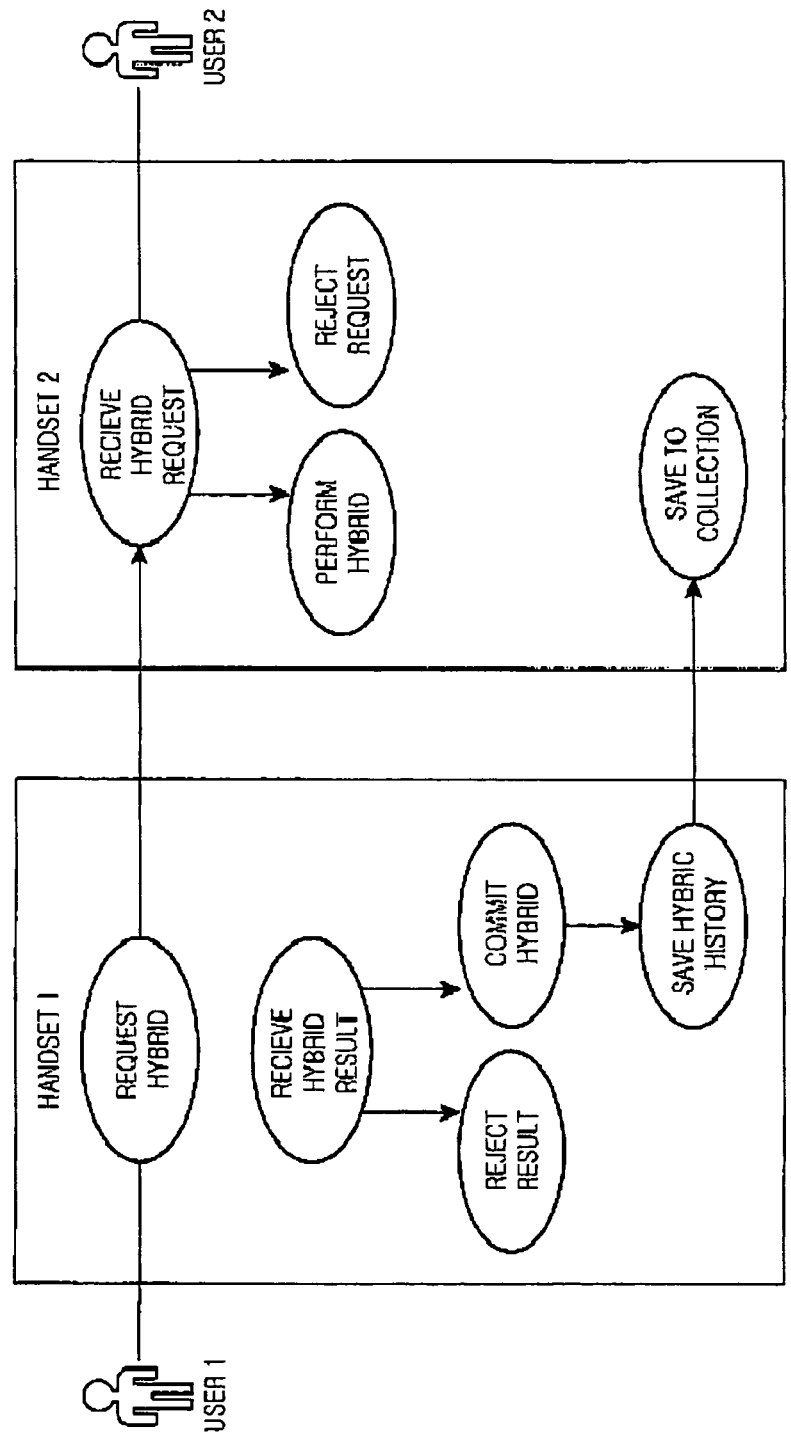
FIG. 12 shows an exemplary hybridization sequence between intelligent agents on two mobile information devices.

FIG. 12 shows an exemplary sequence diagram of such a process. As shown, User 1 sends a request to hybridize the intelligent agent of User 1 with that of User 2 through Handset 1. User 2 can optionally approve or reject the request through Handset 2. If User 2 approves, the hybrid operation is performed between the DNA from both agents on Handset 1. The result is displayed to the requesting party (User 1), who may save this hybrid as a replacement for the current agent. If the hybrid is used as the replacement, then User 2 receives a notice and saves to the hybrid to the hybrid results collection on Handset 2.

EXAMPLE 4

User Interactions with the Present Invention

This Example is described with regard to a plurality of representative, non-limiting, illustrative screenshots, in order to provide an optional but preferred embodiment of the system of the present invention as it interacts with the user.

Figure 13:
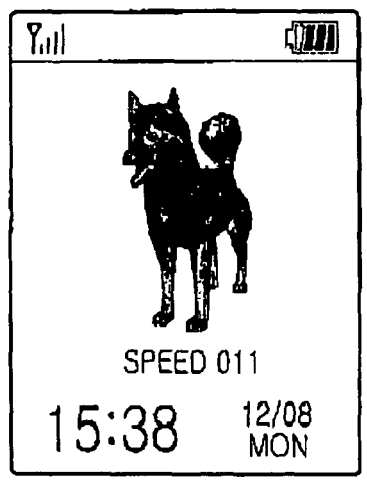
FIGS. 13, 14, 15, 16, 17, 18 and 19 show exemplary screenshots of an avatar or creature according to different embodiments of the present invention.
Figure 14:
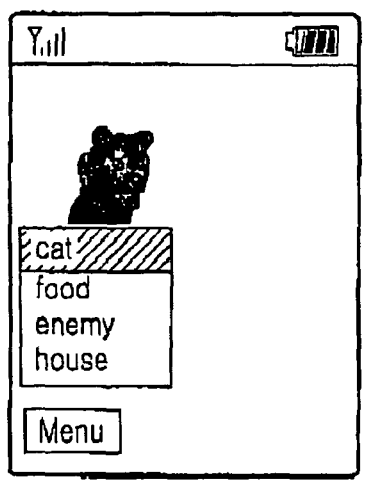

FIG. 13 shows an exemplary screenshot of the "floating agent", which is the creature or avatar (visual expression of the intelligent agent). FIG. 14 shows an exemplary screenshot of a menu for selecting objects for the intelligent agent's virtual world.

Figure 15A:
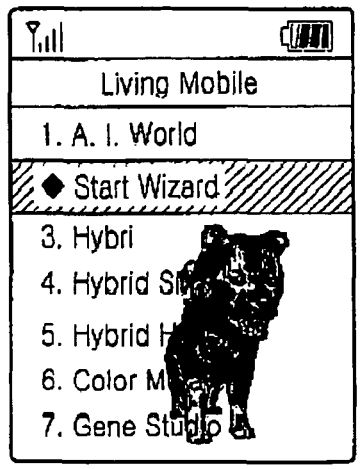

FIG. 15A shows the Start Wizard application, which allows the user to configure and modify the agent settings, as well as user preferences.

Figure 15B:
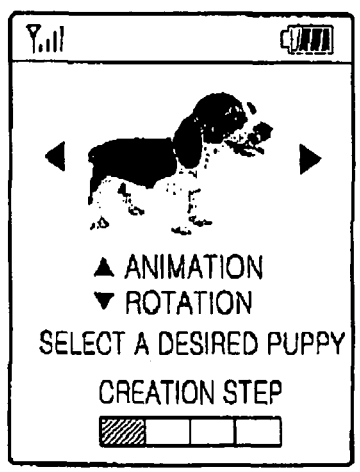
Figure 15C:
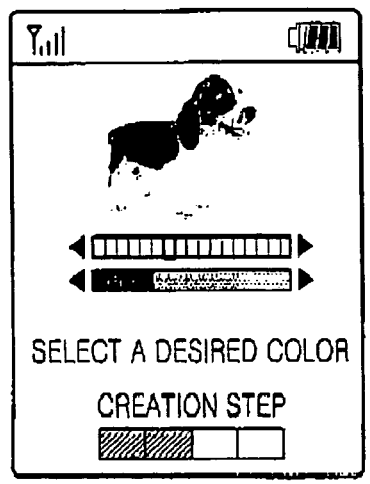
Figure 15D:
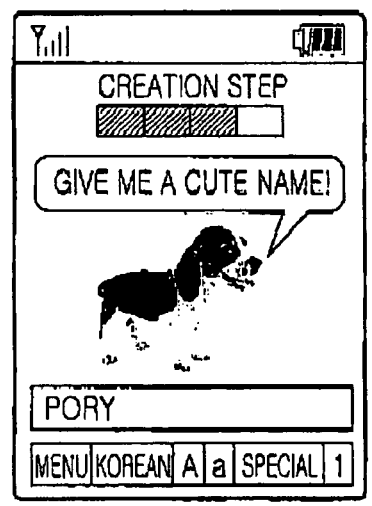
Figure 15E:
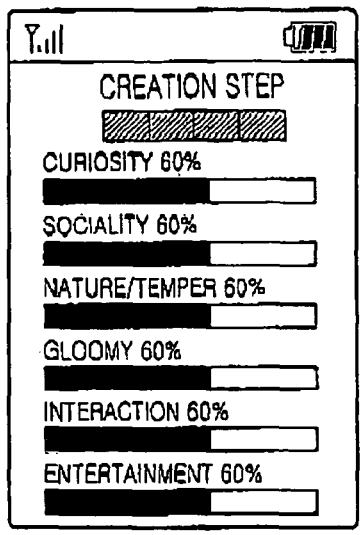
Figure 15F:

FIG. 15B-15F show exemplary screenshots of an initial setting mode for an agent after the start wizard is activated, where FIG. 15B shows a screenshot of a setting mode for selecting the type of the agent; FIG. 15C for selecting a color thereof; FIG. 15D for selecting a name thereof; FIG. 15E for selecting a personality thereof; and FIG. 15F for indicating the completion of the agent setting.

One example of an action to be performed with the wizard is to Set Personality, to determine settings for the emotional system of the intelligent agent. Here, the user can configure the creature's personality and tendencies.

The user can determine the creature's setting by pressing the right arrow key in order to increase the level of the characteristic and in order to do the opposite and decrease the level of the various characteristics such as Enthusiasm, Sociability, Anti_social behavior, Temper (level of patience), Melancholy, Egoistic behavior, and so forth.

The user is also able to set User Preferences, for example to determine how quickly to receive help. Some other non-limiting examples of these preferences include: communication (extent to which the agent communicates); entertain_user (controls agent playing with the user); entertain_self (controls agent playing alone); preserve_battery (extends battery life); and transparency_level (the level of the transparency of the creature).

The user also sets User Details with the start wizard, including but not limited to, user name, birthday (according to an optional embodiment of the present invention, this value is important in Hybrid SMS since it will define the "konghup" possibility between users, which is the ability to create a hybrid with a favorable astrology pattern; the konghup option is built according to suitable tables of horsocopes and dates), and gender. Here, the "konghup" (also called "goong-hap") is a Korean word used to describe marital harmony as predicted by a fortuneteller, and the konghup possibility can be defined as the possibility of a favorable astrology pattern for interpersonal relationship.

The user can also preferably set Creature Details.

Figure 16:
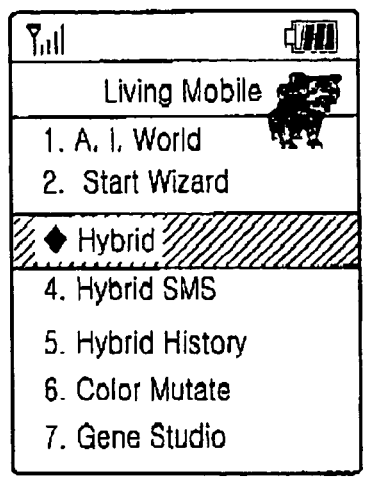

FIG. 16 shows an exemplary menu for performing hybridization through the hybrid application as previously described.

Figure 17A:
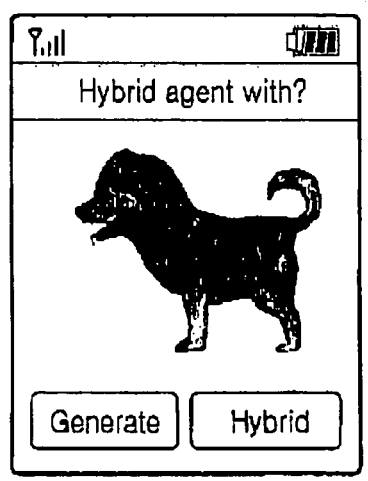
Figure 17B:
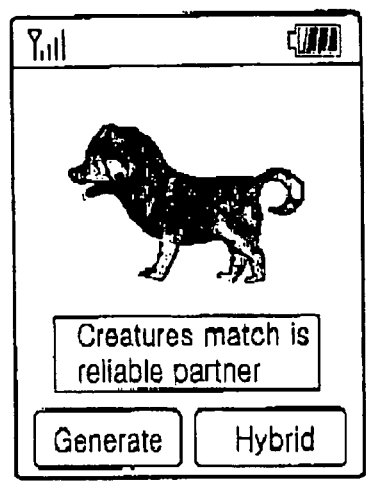

FIG. 17A shows an exemplary screenshot for viewing a new creature and generating again, by pressing on the Generate button, which enables the user to generate a creature randomly. FIG. 17B shows the resultant creature in a screenshot with a Hybrid button: pressing on this button confirms the user's creature selection and passes to the creature preview window.

The preview window allows the user to see the newly generated creature in three dimensions, and optionally to animate the creature by using the following options:

1. Navigation UP key: Zoom In and minimizes the size of the creature.
2. Navigation DOWN key: Zoom Out and maximizes the size of the creature.
3. Navigation LEFT key: Switch between the "Ok" and "Back" buttons.
4. Navigation RIGHT key: Switch between the "Ok" and "Back" buttons.
5. Ok key (OK): Confirm selection.
6. Clear key (CLR): Exit the creature preview window to Living Mobile Menu.
7. End key: Exit the creature preview window to the main menu.
8. '0' key: Lighting and shading operation on the creature.
9. '1' key: Circling the creature to the left with the clock direction.
10. '2' key: Circling the creature in the 3D.
11. '3' key: Circling the creature to the right against the clock direction.
12. '5' Key: Circling the creature in the 3D.
13. '6' key: Animates the creature in many ways. Every new pressing on this key changes the animation type.

The animations that the creature can perform include but are not limited to, walking, sitting, smelling, flying, and jumping.

Figure 18:
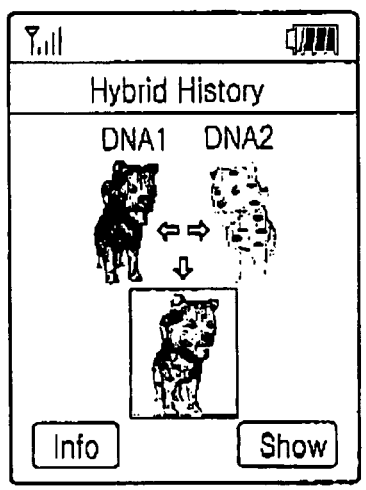

FIG. 18 shows an exemplary screenshot of the hybrid history, which enables the user to review and explore the history of the creature's changes in the generations. The user can see the current creature and its parents, and also the parents of the parents. Preferably, for every creature there can be at most 2 parents. On the other hand, if a current DNA different from a first DNA (DNA 1) is created from the first DNA (DNA 1), the creation can be set to indicate that mutation has occurred.

Figure 19:
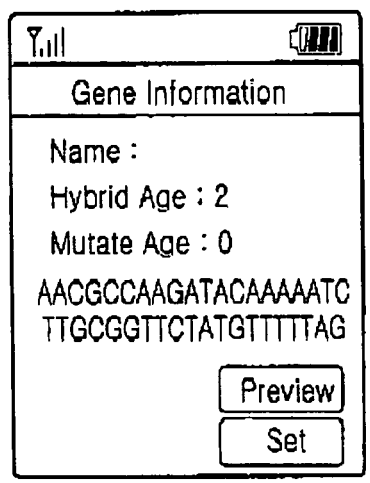

FIG. 19 shows an exemplary screen shot of the Gene studio, with the DNA Sequence of the current creature. The gene studio also preferably gives the opportunity for the user to change and modify the agent's DNA sequence. The agent's DNA sequence displayed on the gene studio screen is preferably composed of a sequence of four letters A, G, C and T. The four letters represent the four bases constituting biological DNA. The present invention introduces the four letters so that the user becomes more familiar with the agent DNA. In the present invention, the four letters correspond to four numbers required to express the quaternary numbers. For example, if $A+0, G=1, C=3$, and $T=3$, then $AA=0, AG=1, \ldots$, and $TT=15$. If the agent has a DNA sequence composed of two letters for each building block as in the above Example 3, it is possible to express 16 ($=4\times4$) different genotypes for each building block. Accordingly, if the agent has 5 building blocks, the agent can be defined as a DNA sequence composed of 10 ($=2\times5$) letters, and the number of possible combinations of the agent is $16^5$. Similarly, if the agent has 10 building blocks and a DNA sequence composed of 4 letters for each building block, it is possible to express 256 ($=4\times4\times4\times4$) different genotypes for each building block, a DNA sequence required to define the agent is composed of 40 ($=4\times10$) letters, and the number of possible combinations of the agent is $256^{10}$. However, the present invention is not limited to these examples.

A description will now be given of an evolving agent system operating in conjunction with the learning module and the action selection system. As described above, the hybrid history or the information as to whether a mutation is selected is stored in the agent system. The learning module can determine preferences or tendencies of the user on the basis of the stored information, and the action selection system can provide an evolution event, according to the determined user preferences or tendencies, to the evolution class diagram. Information as to whether the user selects the result of the performance of the provided evolution event is stored in the agent system, so that the stored information is referred to when the next evolution event is provided.

EXAMPLE 5

Intelligent Agent for a Networked Mobile Information Device

This example relates to the use of an intelligent agent on a networked mobile information device, preferably a cellular telephone. The intelligent agent comprises an avatar for interacting with the user, and an agent for interacting with other components on the network, such as other mobile information devices, and/or the network itself. The avatar forms the user interface (or a portion thereof) and also has an appearance, which is more preferably three-dimensional. This appearance may be humanoid but may alternatively be based upon any type of character or creature, whether real or imaginary. The agent then handles the communication between the avatar and the mobile information device, and/or other components on the network, and/or other avatars on other mobile information devices. It should also be noted that although this implementation is described with regard to mobile information devices such as cellular telephones, the avatar aspect of the implementation (or even the agent itself) may be implemented with the adaptive system (Example 2) and/or proactive user interface (Example 1) as previously described.

The intelligent agent of the present invention is targeted at creating enhanced emotional experience by applying the concept of a "Living Device". This concept includes both emphases upon the uniqueness of the intelligent agent, as every living creature is unique and special in appearance and behavior, while also providing variety, such as a variety of avatar appearances to enhance the user's interaction with the living device. The avatar preferably has compelling visual properties, with suitable supplementary objects and surrounding environment.

The intelligent agent preferably displays intelligent decision making, with unexpected behavior that indicates its self-existence and independent learning. Such independent behavior is an important aspect of the present invention, as it has not been previously demonstrated for any type of user interface or interaction for a user and a computational device of any type, and has certainly not been used for an intelligent agent for a mobile information device. The intelligent agent can also evolve with time, as all living things, displaying visual changes. This is one of the most important "Living Device" properties.

The evolution step initiates an emotional response from the user of surprise and anticipation for the next evolution step.

Evolution is a visual change of the creature with respect to time. The time frame may be set to a year for example, as this is the lifecycle of midrange cellular telephone in the market During the year or quarter, periodic changes preferably occur through evolution. The evolutionary path (adaptation to the environment) is a result of natural selection. The natural selection can be user driven (i.e. user decides if the next generation is better), although another option is a predefined natural selection process by developing some criteria for automatic selection.

The intelligent agent may be implemented for functioning in two "worlds" or different environments: the telephone world and the virtual creature world. The telephone (mobile information device) world enables the intelligent agent to control different functions of the telephone and to suggest various function selections to the user, as previously described. Preferably the intelligent agent is able to operate on the basis of one or more telephone usage processes that are modeled for the agent to follow. Another important aspect of the telephone world is emotional expressions that can be either graphic expressions such as breaking the screen or free drawing or facial and text expressions one or two relevant words for the specific case.

The virtual world is preferably a visual display and playground area, where objects other than the avatar can be inserted and the user can observe the avatar learning and interacting with them. The objects that are entered into the world can be predefined, with different behaviors resulting from the learning process. The user can give rewards or disincentives and be part of the learning process. In this respect, the intelligent agent (through the appearance of the avatar) may act as a type of virtual pet or companion (for example, act as a running puppy or a laughing person).

Some preferred aspects of the intelligent agent include but are not limited to, a 3D graphic infrastructure (with regard to the appearance of the avatar); the use of AI and machine learning mechanisms to support both adaptive and proactive behavior; the provision of gaming capabilities; the ability to enhance the usability of the mobile information device and also to provide specific user assistance; and provision of a host platform abstraction layer. Together, these features provide a robust, compelling and innovative content platform to support a plurality of AI applications all generically defined to be running on the mobile information device.

The avatar also preferably has a number of important visual aspects. For example, the outer clip size may optionally be up to 60×70 pixels, although a different resolution may be selected according to the characteristics of the screen display of the mobile information device. The avatar is preferably represented as a 3D polygonal object with several colors, but in any case preferably has a plurality of different 3D visual characteristics, such as shades, textures, animation support and so forth. These capabilities may be provided through previously created visual building blocks that are stored on the mobile information device. The visual appearance of the avatar is preferably composed in runtime.

The avatar may start "living" after a launch wizard, taking user preferences into account (user introduction to the living device). In addition to evolution, the avatar may display small visual changes that represent mutations (color change/movement of some key vertices in a random step). Visual evolution step is preferably performed by addition/replacement of a building block. The avatar can preferably move in all directions and rotate, and more is a fully animated 3D character.

The avatar is preferably shown as floating over the mobile information device display with the mobile information device user interface in the background, but may also be dismissed upon a request by the user. The avatar is preferably able to understand the current user's normal interaction with the mobile information device and tries to minimize forced hiding/dismissal by the user.

According to optional but preferred embodiments of the present invention, the avatar can be programmed to "move" on the screen in a more natural, physically realistic manner. For example, various types of algorithms and parameters are available which attempt to describe physically realistic behavior and movement for controlling the movement of robots. Examples of such algorithms and parameters are described in "Automatic Generation of Kinematic Models for the Conversion of Human Motion Capture Data into Humanoid Robot Motion", A. Ude et al., *Proc. First IEEE-RAS Int. Conf. Humanoid Robots* (*Humanoids* 2000), Cambridge, Mass., USA, September 2000 (hereby incorporated by reference as if fully set forth herein). This reference describes various human motion capture techniques, and methods for automatically translating the captured data into humanoid robot kinetic parameters. Briefly, both human and robotic motion are modeled, and the models are used for translating actual human movement data into data that can be used for controlling the motions of humanoid robots.

This type of reference is useful as it provides information on how to model the movement of the humanoid robot. Although the present invention is concerned with realistic movement of an avatar (virtual character being depicted three-dimensionally), similar models could optionally be used for the avatar as for the humanoid robot. Furthermore, a model could also be constructed for modeling animal movements, thereby permitting more realistic movement of an animal or animal-like avatar. More generally, the system can handle any given set of 3D character data generically.

These models could also be used to permit the movement of the avatar to evolve, since different parameters of the model could be altered during the evolutionary process, thereby changing how the avatar moves. Such models are also useful for describing non-deterministic movement of the avatar, and also for enabling non-deterministic movements to evolve. Such non-deterministic behavior also helps to maintain the interest of the user.

In order to implement these different functions of the avatar and/or intelligent agent, the intelligent agent may be constructed as described below with regard to FIGS. 20-23b, although it should be noted that these figures only represent one exemplary implementation and that many different implementations are possible. Again, the implementation of the intelligent agent may incorporate or rely upon the implementations described in Examples 1 and 2 above.

Figure 20:
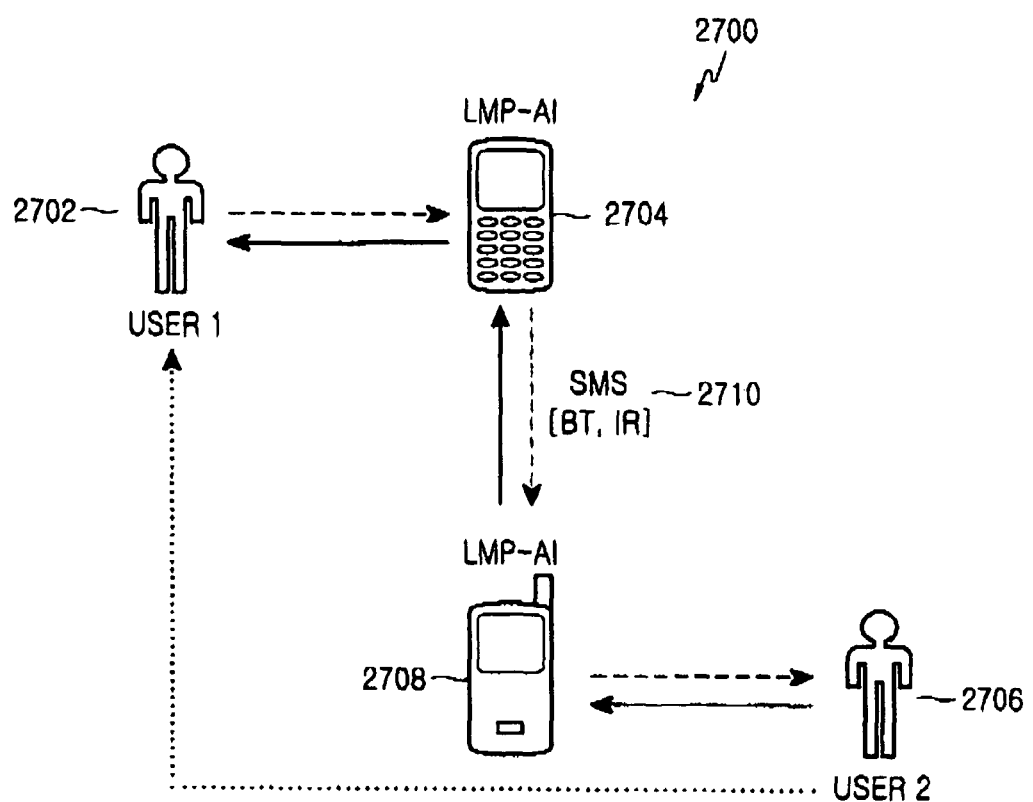
FIG. 20 is a block diagram of an exemplary intelligent agent system according to the present invention.

FIG. 20 is a block diagram of an intelligent agent system 2700 according to the present invention. As shown, a first user 2702 controls a first mobile information device 2704, which for the purpose of this example may be implemented as a cellular telephone for illustration only and without any intention of being limiting. A second user 2706 controls a second mobile information device 2708. The first mobile information device 2704 and the second mobile information device 2708 preferably communicate through a network 2710, for example through messaging.

Each of the first mobile information device 2704 and the second mobile information device 2708 preferably features an intelligent agent, for interacting with their respective users 2702 and 2706 and also for interacting with the other intelligent agent. Therefore, as shown, the system 2700 enables a community of such intelligent agents to interact with each other, and/or to obtain information for their respective users through the network 2710, for example.

The interactions of the users 2702 and 2706 with their respective mobile information devices 2704, 2708 preferably include the regular operation of the mobile information device, but also add the new exciting functionalities of "living mobile phone". These functionalities can include the intelligent agent but also the use of an avatar for providing a user interface and also more preferably for providing an enhanced user emotional experience.

The intelligent agent preferably features an "aware" and intelligent software framework. The inner operation of such a system preferably involve several algorithmic tools, including but not limited to AI and ML algorithms.

The system 2700 may involve interactions between multiple users as shown. Such interactions increase the usability and enjoyment of using the mobile information device for the end-user.

Figure 21:
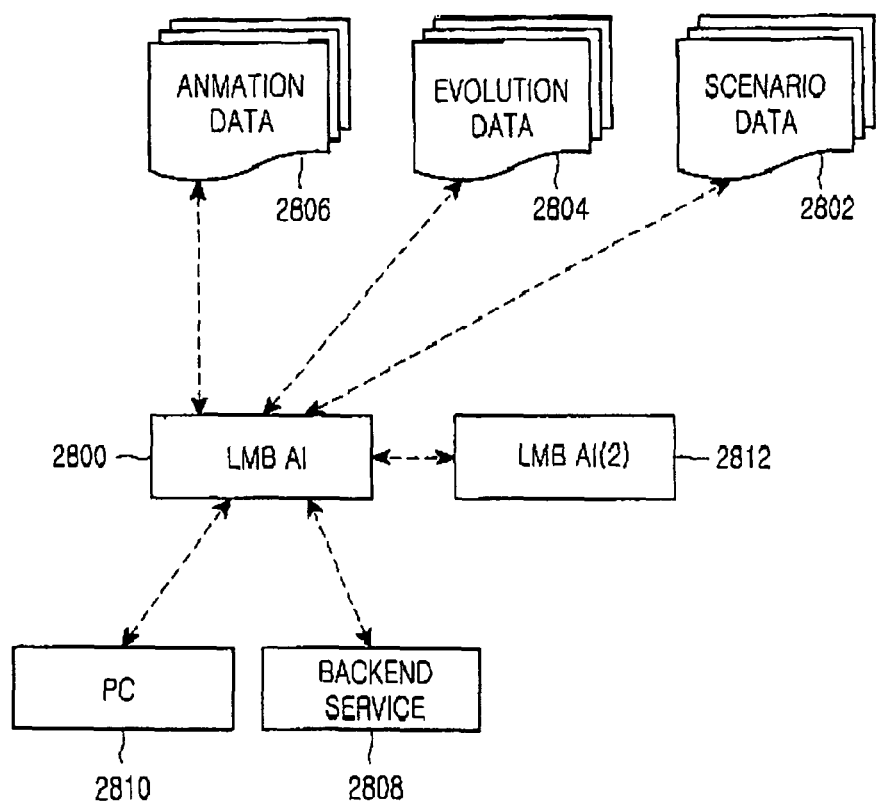
FIG. 21 shows the system of FIG. 20 in more detail.

FIG. 21 shows the intelligent agent system of FIG. 20 in more detail. As shown, a first intelligent agent 2800 is able to operate according to scenario data 2802 (such as the previously described knowledge base) in order to be able to take actions, learn and make decisions as to the operation of the mobile information device. The learning and development process of the first intelligent agent 2800 is supported by an evolution module 2804 for evolving as previously described. If the first intelligent agent 2800 communicates with the user through an avatar, according to a preferred embodiment of the present invention, then an animation module 2806 is used to support the appearance of the avatar.

The first intelligent agent 2800 may also communicate through the network (not shown) with a backend server 2808 and/or another network resource such as a computer 2810, for example for obtaining information for the user.

The first intelligent agent 2800 may also communicate with a second intelligent agent 2812 as shown.

FIG. 22 shows a block diagram of an exemplary implementation of an action selection system 2900 according to the present invention, which provides the infrastructure for enabling the intelligent agent to select an action.

The action selection system 2900 preferably features an ActionManager 2902 (see also FIG. 10 for a description), which actually executes the action. A BaseAction interface 2904 provides the interface for all actions executed by the ActionManager 2902.

Actions may use device and application capabilities denoted as an AnimationManager 2906 and a SoundManager 2908 that are necessary to perform the specific action. Each action aggregates the appropriate managers for the correct right execution.

The AnimationManager 2906 may also control a ChangeUIAction 2910, which changes the appearance of the visual display of the user interface. In addition or alternatively, if an avatar is used to represent the intelligent agent to the user, the AnimationManager 2906 may also control a GoAwayFromObjectAction 2912 and a GoTowardObjectAction 2914, which enables the avatar to interact with virtual objects in the virtual world of the avatar.

Figure 23A:
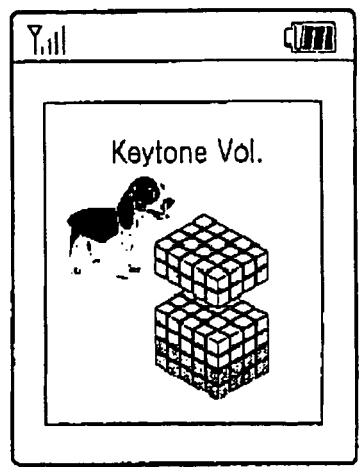
FIGS. 23A and 23B show exemplary screenshots of the avatar according to the present invention on the screen of the mobile information device.
Figure 23B:
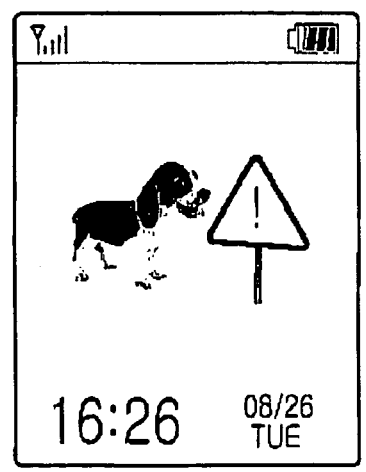

FIGS. 23A and 23B show two exemplary, illustrative non-limiting screenshots of the avatar according to the present invention on the screen of the mobile information device. FIG. 23A shows an exemplary screenshot of the user interface for adjusting the ring tone volume through an interaction with the avatar. FIG. 23B shows an exemplary screenshot of the user interface for receiving a message through an interaction with the avatar.

While the invention has been described with respect to a limited number of embodiments, it will be appreciated that many variations, modifications and other applications of the invention may be made.

What is claimed is:

1. A device having an operating system executing a proactive user interface, the device comprising:
   a memory; and
   a processor coupled to the memory and comprising:
   (a) an interface unit for communication between a user of the proactive user interface and said operating system, said interface unit including an evolving avatar enabling communication with the user; and
   (b) a learning module for detecting at least one pattern of interaction of the user with said interface unit, and actively suggesting, to the user, options for evolving at least one function of the user interface according to said at least one pattern by at least one of altering an appearance of at least a portion of a display, changing a menu or a portion thereof, and altering touch screen functionality,
   wherein, if a suggestion or an action provided by the interface unit is approved by the user, the interface unit provides positive incentive to the proactive user interface, if the suggestion or the action provided by the interface unit is disapproved by the user, the interface provides a disincentive to the proactive user interface, and wherein at least one of the positive incentive and the disincentive are used in determining a state of the evolving avatar,
   wherein at least one characteristic of an appearance of said avatar is optionally alterable according to a user command, and
   wherein one or more characteristics of the appearance of said avatar are alterable according to an automated evolutionary algorithm.

2. The device of claim 1, wherein said at least one pattern is selected from the group consisting of a pattern determined according to at least one previous interaction of the user with said interface unit, a predetermined pattern, and a combination thereof.

3. The device of claim 1, wherein said computational device is selected from a group consisting of a regular computer, an ATM, mobile information devices including a cellular telephone, a PDA, and a consumer appliance having an operating system.

4. The device of claim 2, wherein said computational device is selected from a group consisting of a regular computer, an ATM, mobile information devices including a cellular telephone, a PDA, and a consumer appliance having an operating system.

5. The device of claim 1, wherein said learning module comprises a knowledge base for storing information gathered as a result of interactions with the user and/or the operating system.

6. The device of claim 5, wherein said knowledge base comprises a plurality of integrated knowledge items determined from the behavior of the user and from preprogrammed information.

7. The device of claim 5, wherein said learning module further comprises a plurality of sensors for perceiving a state of the operating system.

8. The device of claim 7, wherein said learning module further comprises a perception unit for processing output from said sensors to determine a state of the operating system and a state of said interface unit.

9. The device of claim 5, wherein said learning module further comprises a reasoning system for updating said knowledge base and for learning an association between an alteration of said interface unit and a state of the operating system.

10. The device of claim 5, wherein said learning module maximizes a percentage of proactive alterations leading to a direct user selection from said active suggestion.

11. The device of claim 7, wherein said learning module maximizes a percentage of proactive alterations leading to a direct user selection from said active suggestion.

12. The device of claim 7, wherein said learning module maximizes a percentage of proactive alterations leading to a direct user selection from said active suggestion.

13. The device of claim 9, wherein said learning module maximizes a percentage of proactive alterations leading to a direct user selection from said active suggestion.

14. The device of claim 10, wherein said maximization is performed through learning reinforcement.

15. The device of claim 11, wherein said maximization is performed through learning reinforcement.

16. The device of claim 12, wherein said maximization is performed through learning reinforcement.

17. The device of claim 13, wherein said maximization is performed through learning reinforcement.

18. The device of claim 14, wherein said learning reinforcement is performed through an iterative learning process.

19. The device of claim 15, wherein said learning reinforcement is performed through an iterative learning process.

20. The device of claim 16, wherein said learning reinforcement is performed through an iterative learning process.

21. The device of claim 17, wherein said learning reinforcement is performed through an iterative learning process.

22. The device of claim 18, wherein each iteration of said learning process is performed after said evolution has been performed.

23. The device of claim 19, wherein each iteration of said learning process is performed after said evolution has been performed.

24. The device of claim 20, wherein each iteration of said learning process is performed after said evolution has been performed.

25. The device of claim 21, wherein each iteration of said learning process is performed after said evolution has been performed.

26. The device of claim 8, wherein said learning module maximizes a percentage of proactive alterations leading to a direct user selection from said active suggestion.

* * * * *